United States Patent
Mizuno

(10) Patent No.: US 8,698,425 B2
(45) Date of Patent: *Apr. 15, 2014

(54) LED LIGHTING DEVICE AND DRIVING METHOD FOR THE SAME

(71) Applicant: Rohm Co., Ltd., Kyoto (JP)

(72) Inventor: Jun Mizuno, Kyoto (JP)

(73) Assignee: Rohm Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/784,183

(22) Filed: Mar. 4, 2013

(65) Prior Publication Data

US 2013/0181628 A1 Jul. 18, 2013

Related U.S. Application Data

(63) Continuation of application No. 12/530,458, filed as application No. PCT/JP2008/054195 on Mar. 7, 2008, now Pat. No. 8,410,727.

(30) Foreign Application Priority Data

Mar. 8, 2007 (JP) ................................. 2007-058653
Jun. 11, 2007 (JP) ................................. 2007-154153

(51) Int. Cl.
*H05B 37/02* (2006.01)

(52) U.S. Cl.
USPC ............ 315/307; 315/210; 315/312; 315/360

(58) Field of Classification Search
USPC ............. 315/209 R, 246, 250, 287, 291, 294, 315/299, 307, 308, 309, 312, 360
See application file for complete search history.

(56) References Cited

U.S. PATENT DOCUMENTS 6,329,764 B1 * 12/2001 van de Ven .................... 315/291
6,567,009 B2    5/2003 Ohishi et al.
(Continued)

FOREIGN PATENT DOCUMENTS

CN    1575394 A    2/2005
EP    1462711 A1   9/2004
(Continued)

OTHER PUBLICATIONS

International Search Report for International Application No. PCT/JP2008/054195 mailed May 13, 2008 with English translation.

(Continued)

*Primary Examiner* — Tung X Le
(74) *Attorney, Agent, or Firm* — Cantor Colburn LLP

(57) ABSTRACT

It is provided an LED lighting device calibratable to 0 to 100% of wide range about a chromaticity and luminance of a illumination light by a simple configuration, and a driving method for the LED lighting device. The LED lighting device is provided with a first light-emitting unit and a second light-emitting unit differing a color temperature mutually, and a control circuit for executing a cyclic light/quench control of the first light-emitting unit and the second light-emitting unit, and for executing a light control of the first light-emitting unit and the second light-emitting unit by a PNM (Pulse Number Modulation) control in a fixed cycle so as to have a lighting period Ton for lighting/quenching the first light-emitting unit and the second light-emitting unit complementarily, and a quenching period Toff for quenching both the first light-emitting unit and the second light-emitting unit.

20 Claims, 29 Drawing Sheets

(56) References Cited

U.S. PATENT DOCUMENTS

| | | |
|---|---|---|
| 6,628,249 B1 | 9/2003 | Kamikawa et al. |
| 7,145,295 B1 | 12/2006 | Lee et al. |
| 7,446,519 B2 | 11/2008 | Low et al. |
| 7,515,128 B2 | 4/2009 | Dowling |
| 7,573,446 B2 | 8/2009 | Kawaguchi et al. |
| 7,737,643 B2 | 6/2010 | Lys |
| 7,808,446 B2 | 10/2010 | Cunha et al. |
| 7,845,823 B2 | 12/2010 | Mueller et al. |
| 7,928,671 B1 | 4/2011 | Wong et al. |
| 7,928,856 B2 | 4/2011 | Jacubovski et al. |
| 8,177,389 B1 * | 5/2012 | Kropf .......................... 362/231 |
| 2001/0005319 A1 * | 6/2001 | Ohishi et al. .................. 362/555 |
| 2004/0264193 A1 | 12/2004 | Okumura |
| 2005/0168564 A1 | 8/2005 | Kawaguchi et al. |
| 2006/0022616 A1 | 2/2006 | Furukawa et al. |
| 2006/0114201 A1 | 6/2006 | Chang |
| 2007/0024210 A1 | 2/2007 | Zwanenburg et al. |
| 2007/0046485 A1 | 3/2007 | Grootes et al. |
| 2008/0030153 A1 | 2/2008 | Mizuno |
| 2009/0021178 A1 * | 1/2009 | Furukawa et al. ............ 315/250 |
| 2009/0096724 A1 | 4/2009 | Ichikawa et al. |
| 2010/0320928 A1 | 12/2010 | Kaihotsu et al. |
| 2011/0037413 A1 | 2/2011 | Negley et al. |
| 2011/0101881 A1 * | 5/2011 | Kamikawa et al. ........... 315/250 |

FOREIGN PATENT DOCUMENTS

| | | |
|---|---|---|
| JP | 61-148799 A | 7/1986 |
| JP | 6-2597 U | 1/1994 |
| JP | 7-56528 A | 3/1995 |
| JP | 7-272863 A | 10/1995 |
| JP | 2002-324685 A | 11/2002 |
| JP | 2005-216711 A | 8/2005 |
| JP | 2006-210836 A | 8/2006 |
| JP | 2007-53320 A | 3/2007 |
| WO | 03019072 A1 | 3/2003 |
| WO | 2007023454 A1 | 3/2007 |

OTHER PUBLICATIONS

Japanese Office Action for Japanese Application No. 2007-154153, issued Oct. 2, 2012, English translation not available.
First Office Action for Chinese Patent Application No. 200880011887.7, dated Feb. 29, 2012, with English translation.

* cited by examiner

FIG. 7A
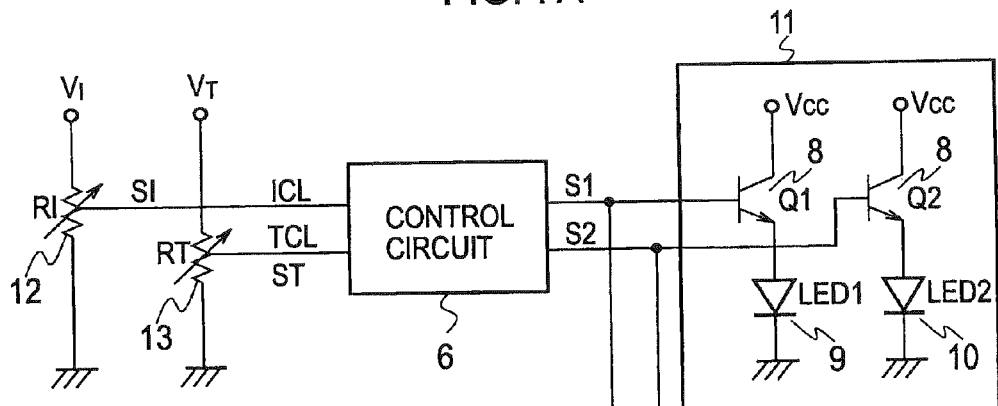
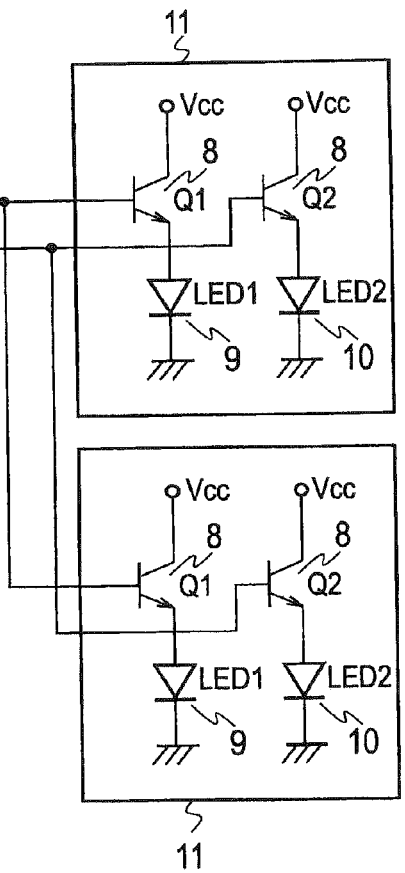
FIG. 7B
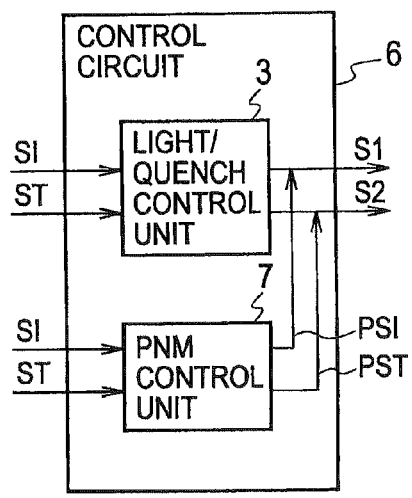

128 WAVEFORMS

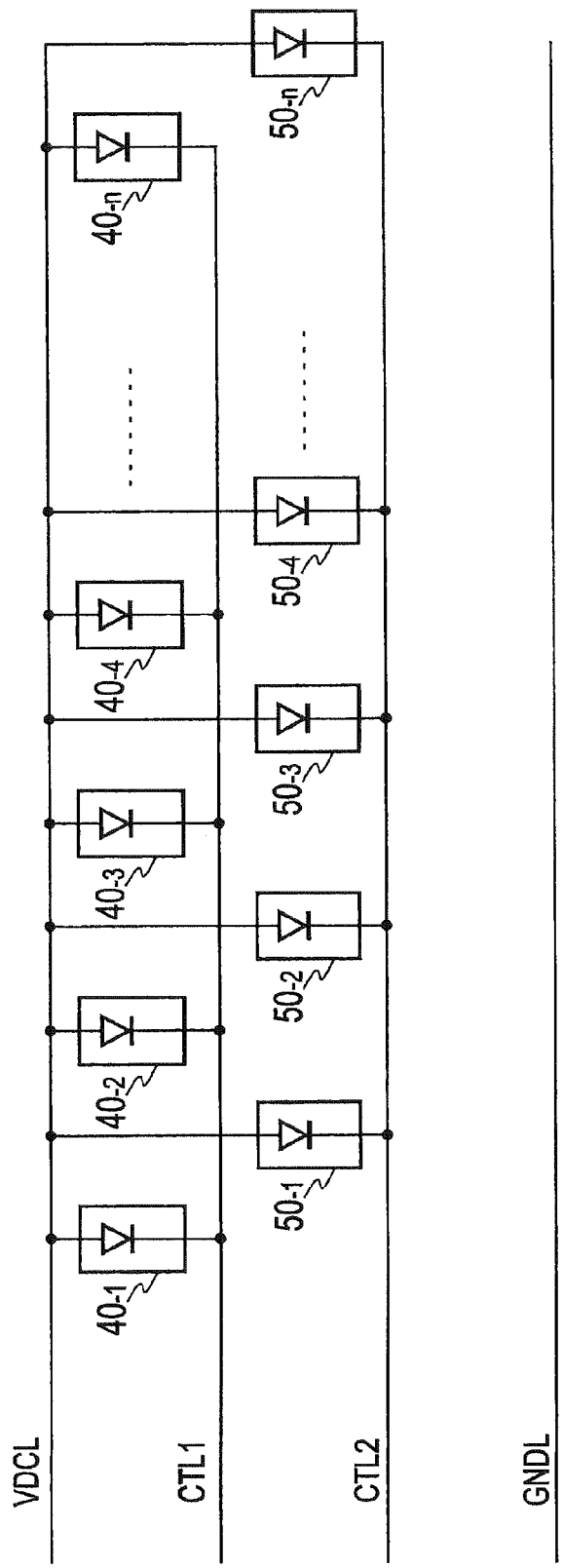

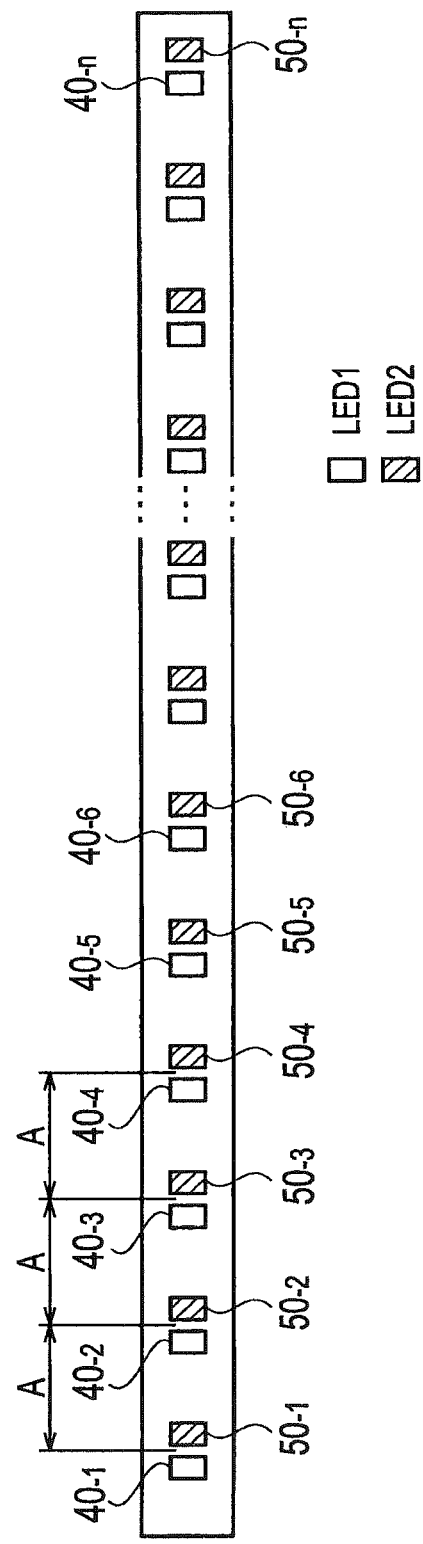

A : LED1 ON
B : LED2 ON

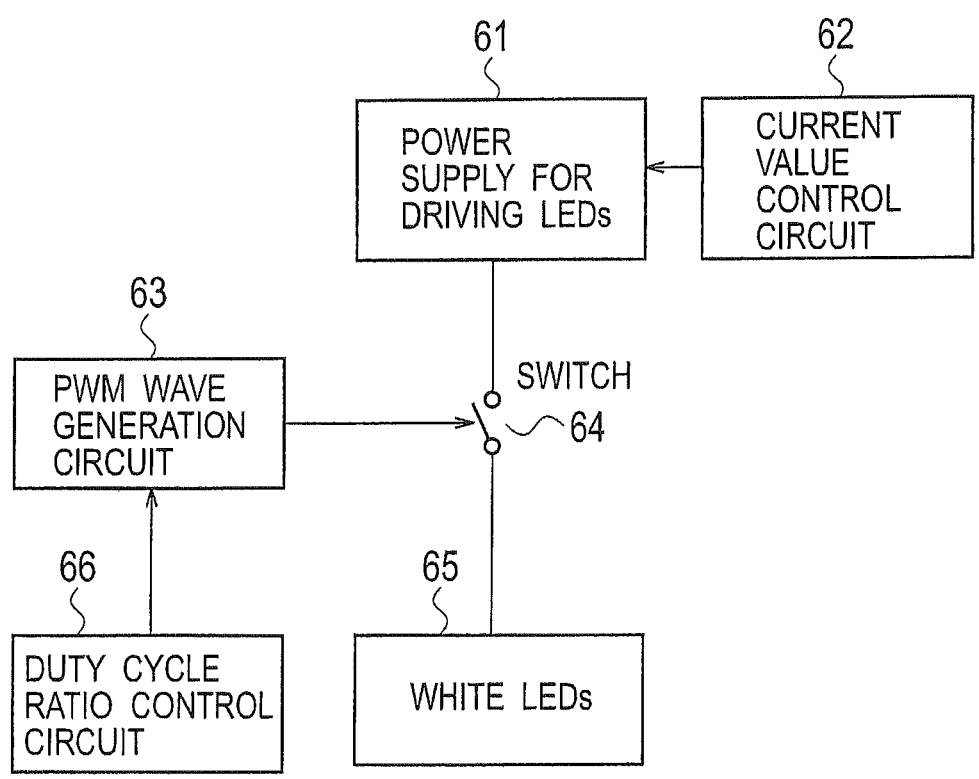

LED LIGHTING DEVICE AND DRIVING METHOD FOR THE SAME

CROSS REFERENCE TO RELATED APPLICATIONS

The present application is a continuation application of U.S. patent application Ser. No. 12/530,458, filed on Feb. 4, 2010, the entire contents of which are incorporated herein by reference and priority to which is hereby claimed. Application Ser. No. 12/530,458 is the U.S. National stage of application No. PCT/JP2008/054195, filed Mar. 7, 2008. Priority under 35 U.S.C. §119 (a) and 35 U.S.C. §365(b) is hereby claimed from Japanese Application No. 2007-058653, filed Mar. 8, 2007 and Japanese Application No. 2007-154153, filed Jun. 11, 2007, the disclosures of which are both also incorporated herein by reference.

TECHNICAL FIELD

The present invention relates to an LED lighting device applying an LED (Light Emitting Diode) as a light source, and a driving method for the same, and in particular relates to an LED lighting device for performing a chromaticity control and a luminance control of illumination light, and a driving method for the same.

BACKGROUND ART

As shown in FIG. 36, an LED lighting device according to a conventional example can calibrate the chromaticity and luminance of a illumination light of white LEDs 65 by controlling a level of a current supplied to a white LEDs 65 by a current value control circuit 62 and a power supply for driving LEDs 61, and controlling a ratio of the ON time and OFF time of the current supplied to the white LEDs 65 by the switch 64, a duty cycle ratio control circuit 66, and a PWM (Pulse Width Modulation) wave generation circuit 63 (for example, refer to Patent Literature 1).

However, persistently, the conventional technology of Patent Literature 1 calibrates the chromaticity of the illumination light by controlling a driving current of the white LEDs 65, and is not necessarily wide about its chromaticity control range.

Moreover, in the conventional technology of Patent Literature 1, since the both sides of the driving current of the white LEDs 65 and the on duty cycle has to be controlled in order to calibrate the chromaticity and luminance (luminous intensity) of the illumination light of the white LEDs 65, its control is complicated.

Moreover, it is disclosed an LED light characterized by comprising white LEDs set as the predetermined color temperature, and calibrated color LEDs having peak wavelength in a specific wavelength region in contrast to this, and composing the setting color temperature of the white LEDs calibratable based on a color mixture rate of the white LEDs and the calibrated color LEDs (for example, refer to Patent Literature 2).

However, persistently, the conventional technology of Patent Literature 2 achieves only chromaticity control of illumination light, and does not disclose about the luminance control of the illumination light at all.

On the other hand, regular intervals nature of human being's perception is said for the difference of the reciprocal of a color temperature, i.e., the difference of inverse correlated color temperature, to be nearer rather than the difference of the color temperature.

For example, if the variation to a color temperature 6500K from a color temperature 6000K is compared with the variation to a color temperature 3500K from a color temperature 3000K, the human beings' perception perceives that the variation to the color temperature 3500K from the color temperature 3000K is larger also with the same difference of 500K.

Patent Literature 1: Japanese Patent Application Laying-Open Publication No. 2002-324685
Patent Literature 2: Domestic Re-Publication of PCT International Publication for Patent Application No. 2003-019072

The purpose of the present invention is to provide an LED lighting device calibratable to 0 to 100% of large area about the chromaticity and the luminance of the illumination light by a simple configuration.

Furthermore, the purpose of the present invention is to provide an LED lighting device and a driving method for the same: calibratable to 0 to 100% of large area about the chromaticity and luminance of the illumination light by a simple configuration; and according to the regular intervals nature of human being's perception by calibrating, so that the difference of the inverse correlated color temperature of the LED illumination light may become linearity, and also calibrating the luminance.

DISCLOSURE OF INVENTION

According to one aspect of the present invention for achieving the above-mentioned purpose, it is provided that an LED lighting device comprises: a first light-emitting unit and a second light-emitting unit differing in a color temperature mutually; and a control circuit for executing a cyclic light/quench control of the first light-emitting unit and the second light-emitting unit so as to have a lighting period for lighting/quenching the first light-emitting unit and the second light-emitting unit complementarily, and a quenching period for quenching both the first light-emitting unit and the second light-emitting unit, and for executing a light control of the first light-emitting unit and the second light-emitting unit by a pulse number modulation control in a fixed cycle.

According to another aspect of the present invention, it is provided that an LED lighting device comprises: a first light-emitting unit and a second light-emitting unit differing in a color temperature mutually; and a control circuit for executing a light/quench control of the first light-emitting unit and the second light-emitting unit, the control circuit including a light/quench control unit for executing a cyclic light/quench control of the first light-emitting unit and the second light-emitting unit so as to have a lighting period for lighting/quenching the first light-emitting unit and the second light-emitting unit complementarily, and a quenching period for quenching both the first light-emitting unit and the second light-emitting unit, and a pulse number modulation control unit for executing a light control of the first light-emitting unit and the second light-emitting unit by a pulse number modulation control in a fixed cycle.

According to another aspect of the present invention, it is provided that an LED lighting device comprising: a first light-emitting unit and a second light-emitting unit differing in a color temperature mutually; and a control circuit for executing a cyclic light/quench control of the first light-emitting unit and the second light-emitting unit so as to have a lighting period for lighting/quenching the first light-emitting unit and the second light-emitting unit complementarily, and a quenching period which quenching both the first light-emitting unit and the second light-emitting unit, and for executing a variable control of the ratio between the lighting period of the first light-emitting unit and the lighting period of the second light-emitting unit in the lighting period according to a difference of inverse correlated color temperature of the first light-emitting unit and the second light-emitting unit.

According to another aspect of the present invention, it is provided that an LED lighting device comprises: a first light-emitting unit and a second light-emitting unit differing in a color temperature mutually; and a control circuit for executing a cyclic light/quench control of the first light-emitting unit and the second light-emitting unit so as to have a lighting period for lighting/quenching the first light-emitting unit and the second light-emitting unit complementarily, and a quenching period quenching both the first light-emitting unit and the second light-emitting unit, and for executing a variable control of the ratio between the lighting period of the first light-emitting unit and the lighting period of the second light-emitting unit in the lighting period, and executing a light control of the first light-emitting unit and the second light-emitting unit by a pulse number modulation control in a fixed cycle, according to a difference of inverse correlated color temperature of the first light-emitting unit and the second light-emitting unit.

According to another aspect of the present invention, it is provided that an LED lighting device comprises: a first light-emitting unit and a second light-emitting unit differing in a color temperature mutually; and a control circuit for executing a light/quench control of the first light-emitting unit and the second light-emitting unit, the control circuit including a light/quench control unit for executing a cyclic light/quench control of the first light-emitting unit and the second light-emitting unit, and further executing a variable control of the ratio between the lighting period of the first light-emitting unit and the lighting period of the second light-emitting unit in the lighting period according to a difference of inverse correlated color temperature of the first light-emitting unit and the second light-emitting unit so as to have a lighting period for lighting/quenching the first light-emitting unit and the second light-emitting unit complementarily, and a quenching period for quenching both the first light-emitting unit and the second light-emitting unit, and a pulse number modulation control unit for executing a light control of the first light-emitting unit and the second light-emitting unit by a pulse number modulation control in a fixed cycle, and further executing a light control of the first light-emitting unit and the second light-emitting unit by the pulse number modulation control in the fixed cycle according to the difference of the inverse correlated color temperature.

According to another aspect of the present invention, it is provided that a driving method of an LED lighting device, the LED lighting device including a first light emitting diode and a second light emitting diode differing in a color temperature mutually, and a microcomputer for executing a light/quench control of the first light emitting diode and the second light emitting diode, the driving method comprises: executing, by the microcomputer, a cyclic light/quench control of the first light emitting diode and the second light emitting diode so as to have a lighting period for lighting/quenching the first light emitting diode and the second light emitting diode complementarily, and a quenching period for quenching both the first light emitting diode and the second light emitting diode; and executing, by the microcomputer, a variable control of the ratio between the lighting period of the first light emitting diode and the lighting period of the second light emitting diode in the lighting period according to a difference of inverse correlated color temperature of the first light emitting diode and the second light emitting diode.

BRIEF DESCRIPTION OF THE DRAWINGS

FIG. 7A It is a schematic circuit block configuration diagram of a control system for a LED module, in the LED lighting device according to the first embodiment of the present invention.

FIG. 7B It is a schematic block configuration diagram of a control circuit, in the LED lighting device according to the first embodiment of the present invention.

FIG. 13 It is a schematic circuit block configuration diagram in the case of mounting by adjoining two LED columns from which a color temperature differs, and arraying n-pairs, in the LED lighting device according to the first embodiment of the present invention.

FIG. 14A It is a schematic layout drawing in the case of mounting by adjoining two LED columns from which a color temperature differs, and arraying n-pairs, and is a configuration diagram of the LED lighting device of line shape, in the LED lighting device according to the first embodiment of the present invention.

FIG. 36 It is a schematic block configuration diagram of an LED lighting device according to a conventional example.

BEST MODE FOR CARRYING OUT THE INVENTION

Figure 1:
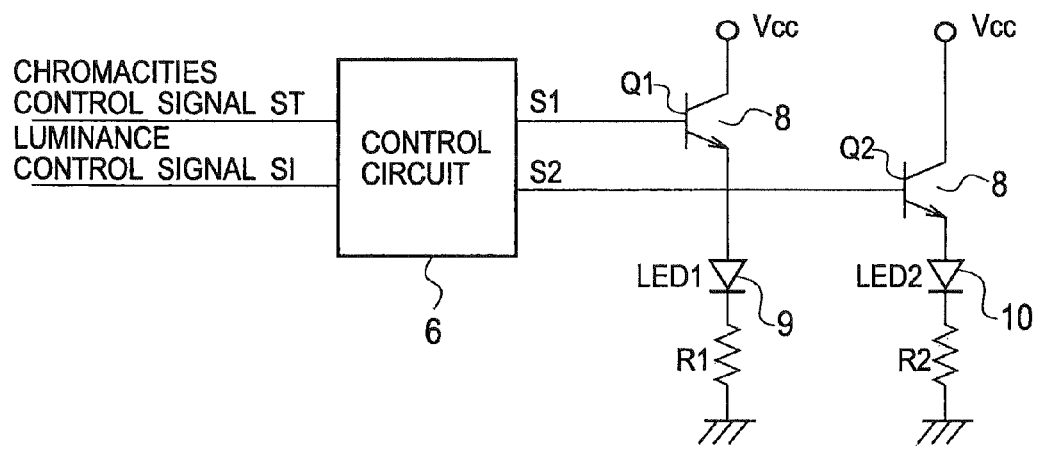
FIG. 1 It is a schematic basic circuit block configuration diagram of an LED lighting device according to a first embodiment of the present invention.

Next, an embodiment of the invention is described with reference to drawings. In the description of the following drawings, the same or similar reference numeral is attached to the same or similar part. However, a drawing is schematic and it should care about differing from an actual thing. Drawings are schematic, not actual, and may be inconsistent in between in scale, ratio, etc.

The embodiment shown in the following exemplifies the device and method for materializing the technical idea of the invention, and the technical idea of the invention does not specify assignment of each component parts, etc. as the following. Various changes can be added to the technical idea of the invention in scope of claims.

First Embodiment

LED Lighting Device

As shown in FIG. 1, an LED lighting device according to a first embodiment of the present invention includes a first light-emitting unit 9 and the second light-emitting unit 10 which differ in a color temperature mutually, and a control circuit 6 for executing light/quench control of the first light-emitting unit 9 and the second light-emitting unit 10.

The control circuit 6 executes a cyclic light/quench control of the first light-emitting unit 9 and the second light-emitting unit 10 so as to have the lighting period Ton for lighting/quenching the first light-emitting unit 9 and the second light-emitting unit 10 complementarily, and the quenching period Toff for quenching both the first light-emitting unit 9 and the second light-emitting unit 10. Furthermore, the control circuit 6 executes a light control of the first light-emitting unit 9 and the second light-emitting unit 10 by PNM (Pulse Number Modulation) control in the fixed cycle TN. Although the PNM is also called PDM (Pulse Density Modulation), it unifies the notation into the PNM here.

A chromaticity control signal ST and a luminance control signal S1 are supplied to the control circuit 6, and the control circuit 6 supplies switching control signals S1 and S2 to the base of bipolar transistors for driving LEDs Q1 and Q2, respectively. Moreover, resistances R1 and R2 are connected to LED1 and LED2 in series, respectively, and are achieved so as to flow the fixed current.

Both of collectors of bipolar transistors for driving LEDs Q1 and Q2 are connected to the power supply line having a power supply voltage Vcc. An emitter of the bipolar transistor for driving LEDs Q1 is connected to an anode of the LED1. An emitter of the bipolar transistor for driving LEDs Q2 is connected to an anode of the LED2. A cathode of the LED1 is connected to a ground line via the resistance R1. A cathode of the LED2 is connected to a ground line via the resistance R2.

Two kinds of white light emitting diodes from which a color temperature differs mutually, for example are used as the LED1 which composes the first light-emitting unit 9 and the LED2 which composes the second light-emitting unit 10.

In the LED lighting device according to the present embodiment, a white light emitting diode having a color temperature of 5000K is used as the LED1, and a white light emitting diode having a color temperature of 2600K is used as the LED2, for example.

However, the above-mentioned color temperatures are exemplifying, and in order to calibrate the color temperature (chromaticity) of the illumination light in a wide range, it is preferable to use two kinds of white light emitting diodes which the color temperature separated as much as possible. Therefore, the color temperatures of the LED1 may be 2500K to 3000K, for example, and the ranges of the color temperature of the LED2 may be 3000K to 6500K, for example.

The control circuit 6 executes the light/quench control of the LED1 and the LED2 by generating the switching control signals S1 and S2 supplied to the base of the bipolar transistors for driving LEDs Q1 and Q2 based on the chromaticity control signal ST and the luminance control signal SI.

More specifically, at the time of lighting of the LED1, the switching control signal S1 is turned to the high-level and the bipolar transistor for driving LEDs Q1 is turned ON. The supply of the driving current to the LED1 is permitted and LED1 is lighted by such the control. On the other hand, at the time of quenching of the LED1, the switching control signal S1 is turned to the low-level and the bipolar transistor for driving LEDs Q1 is turned OFF. The supply of the driving current to the LED1 is stopped and the LED1 is quenched by such the control.

Similarly, at the time of lighting of the LED2, the switching control signal S2 is turned to the high-level and the bipolar transistor for driving LEDs Q2 is turned ON. The supply of the driving current to the LED2 is permitted and the LED2 is lighted by such the control. On the other hand, at the time of quenching of the LED2, the switching control signal S2 is turned to the low-level and the bipolar transistor for driving LEDs Q2 is turned OFF. The supply of the driving current to the LED2 is stopped and the LED2 is quenched by such the control.

Next, the structure of the LED1 and the LED2 will be explained in detail, referring to FIG. 2. In addition, since the LED1 and the LED2 have the same structure, the duplicate explanation is not given.

Figure 2:
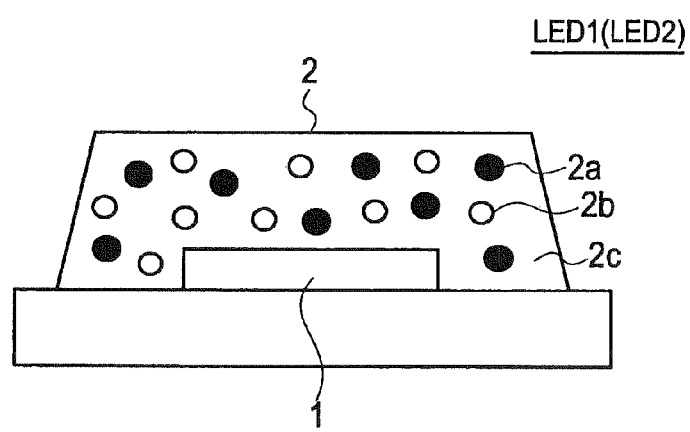
FIG. 2 It is a schematic longitudinal section structural drawing of a light emitting diode (LED1, LED2) applying to the LED lighting device according to the first embodiment of the present invention.

In the LED lighting device according to the present embodiment, as shown in FIG. 2, the LED1 and the LED2 includes a blue light-emitting diode 1 for emitting a blue light, and a fluorescence layer 2 for covering the blue light-emitting diode 1, respectively. The fluorescence layer 2 has a transparent resin which mixes uniformly a red phosphor 2a and a green phosphor 2b for emitting a red light and a green light respectively by exciting by the blue light, or a yellow phosphor 2c for emitting the yellow light by exciting by the blue light.

According to the LED1 comprising the above-mentioned configuration, it is possible to generate a high color-rendering white light by mixing the red light which the red phosphor 2a emits, the green light which the green phosphor 2b emits, and a part of blue lights which are not absorbed into both phosphors.

In addition, what is necessary is just to make the fluorescence layer 2 the configuration for mixing the yellow phosphor 2c, which is excited by the blue light and emits yellow light, uniform to the transparent resin, when giving priority to improvement in luminous efficiency rather than the color-rendering improvement.

Figure 3:
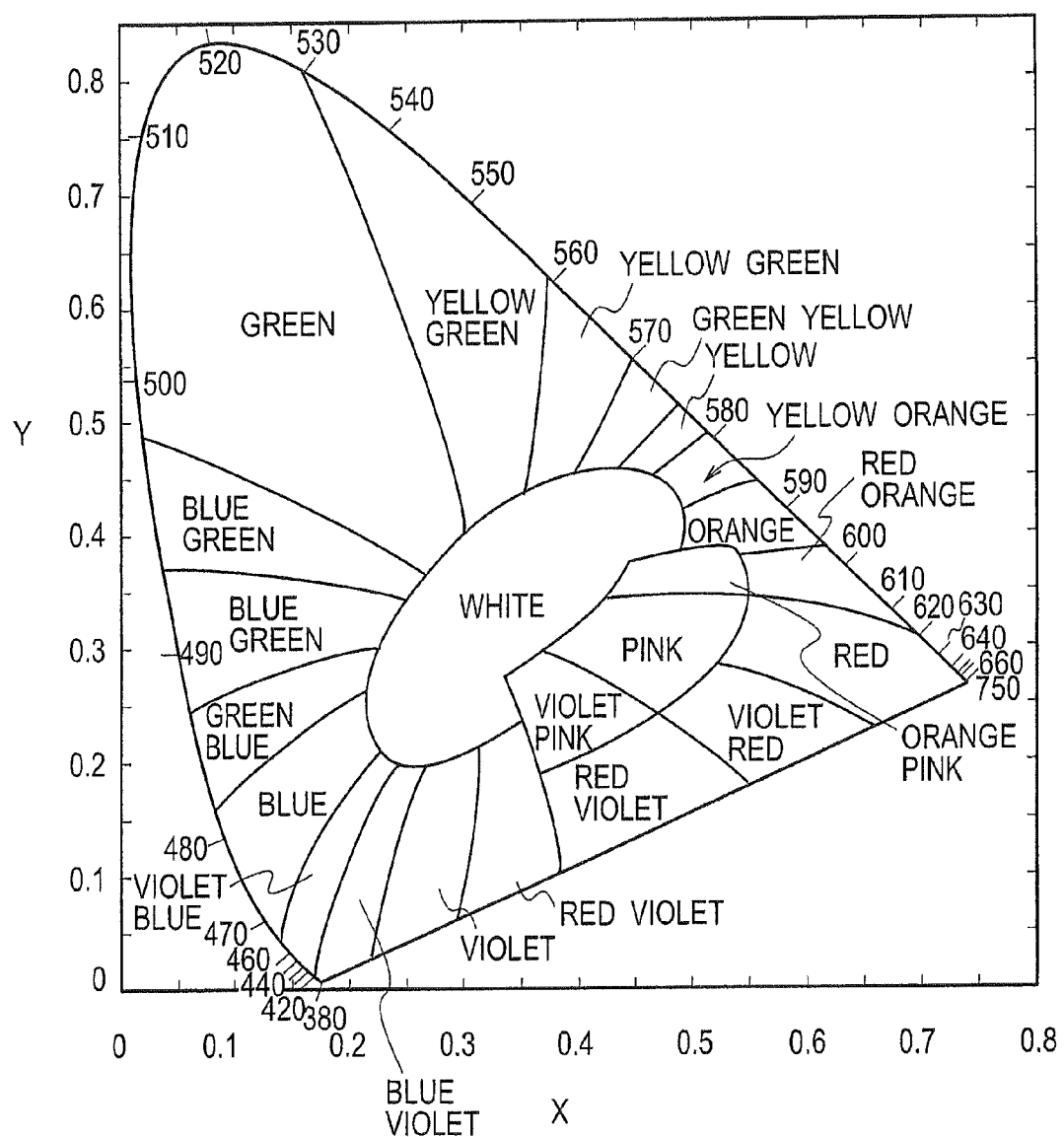
FIG. 3 It is an XY chromaticity diagram of an XYZ color coordinate based on CIE (Comission Internationale de L'Eclairage) 1931.
Figure 4:
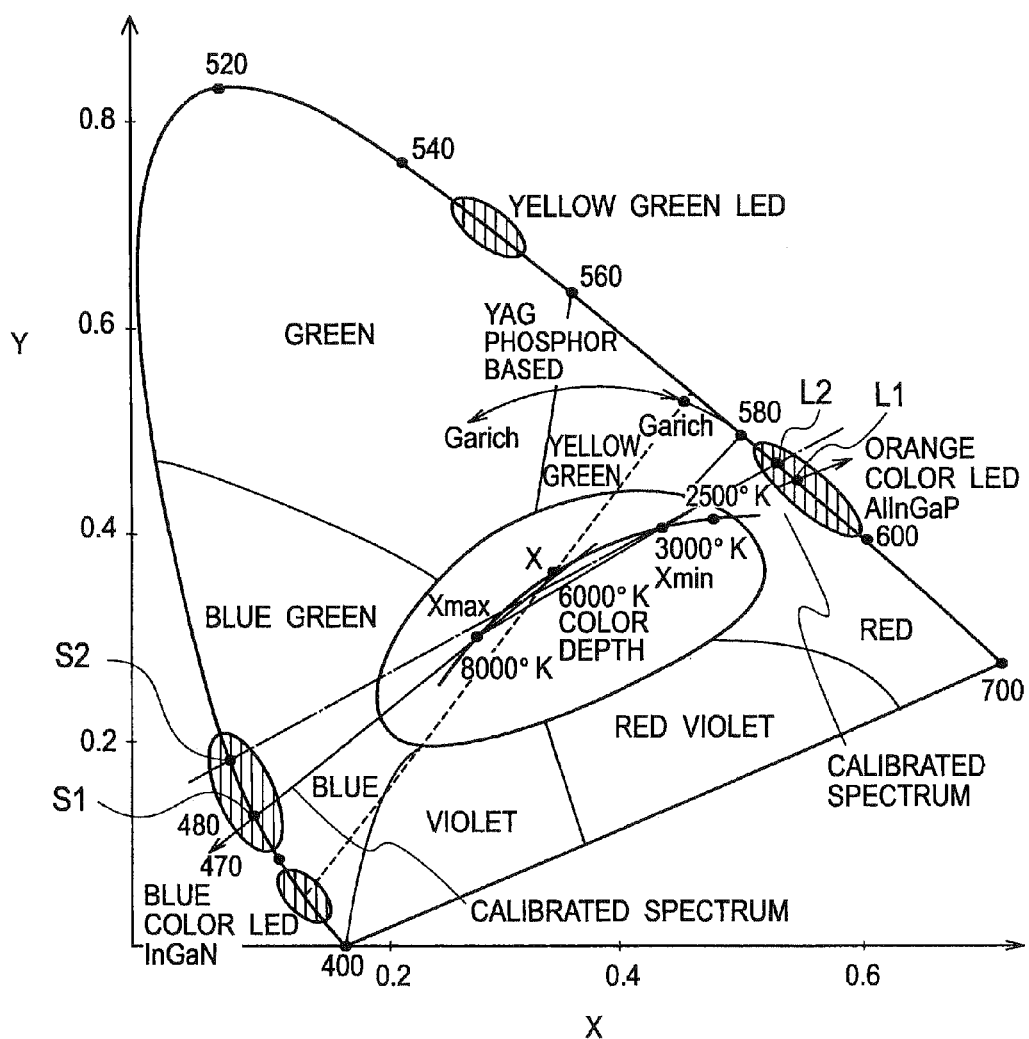
FIG. 4 It is a schematic diagram for explaining a selecting method of LEDs on the XY chromaticity diagram.

FIG. 3 shows an XY chromaticity of an XYZ color coordinate by CIE (Commission Internationale de L'Eclairage) 1931. Moreover, although FIG. 4 is a schematic diagram for explaining a selecting method of LEDs on the XY chromaticity diagram and is a drawing equivalent to FIG. 1 of Patent Literature 2, FIG. 4 can be referred to when selecting the light emitting diode with which the color temperatures differ.

Figure 5:
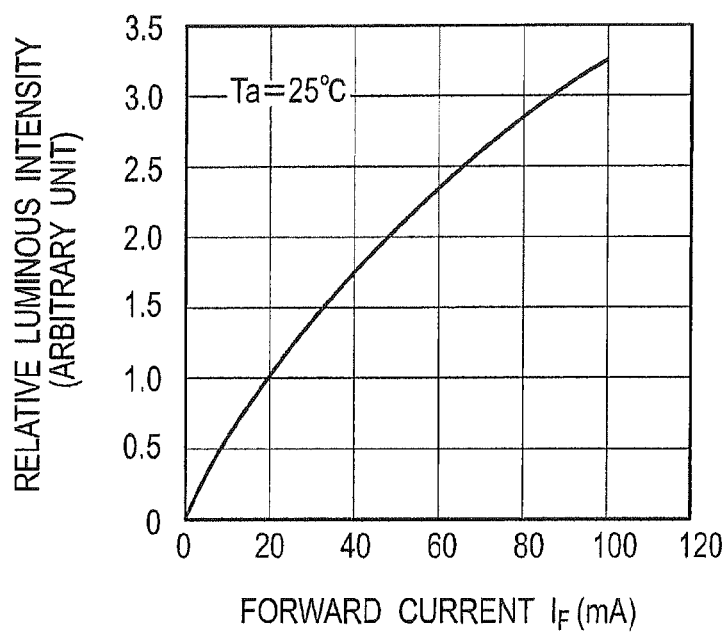
FIG. 5 It is a drawing showing an example of the characteristics of the relation between relative luminous intensity and forward current IF (mA) in white LEDs.
Figure 6:
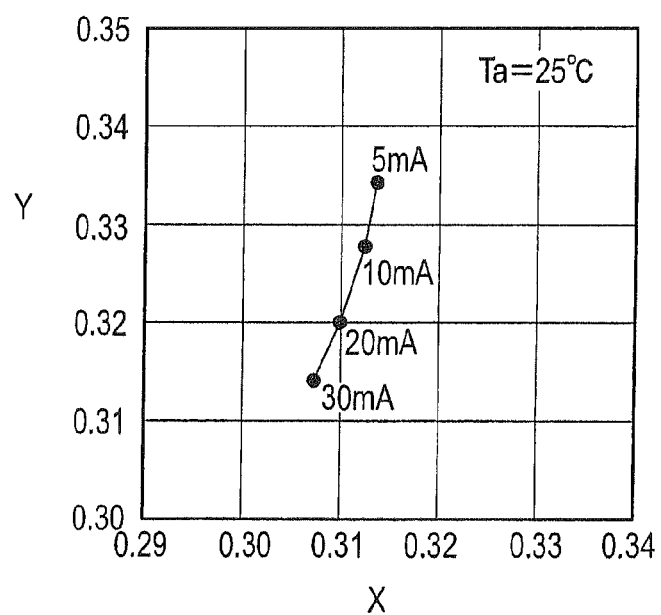
FIG. 6 It is a drawing showing an example of the characteristics of the relation between a chromaticity diagram and the forward current IF (mA) in the white LEDs.

FIG. 5 shows an example of the characteristics of the relation between the relative luminous intensity and the forward current IF (mA), in the white LEDs. FIG. 6 shows an example of the characteristics of the relation between the chromaticity diagram and the forward current IF (mA), in the white LEDs. These drawings are examples of the characteristics of NSCW100 (Nichia Chemical Industries, Ltd.) which is the white LEDs.

As shown in FIG. 5 and FIG. 6, the relative luminous intensity and the chromaticity of the white LEDs change under the environment of room temperature (25 degrees C.) according to the value change of the forward current IF.

More specifically, as shown in FIG. 7A, the LED lighting device related to the present embodiment includes the first light-emitting unit 9 and the second light-emitting unit 10 from which a color temperature differs mutually, and the control circuit 6 for executing the light/quench control of the first light-emitting unit 9 and the second light-emitting unit 10.

As shown in FIG. 7B, the control circuit 6 includes: a light/quench control unit 3 for executing a cyclic light/quench control of the first light-emitting unit 9 and the second light-emitting unit 10 by the PWM (pulse width modulation) control so as to have the lighting period Ton for lighting/quenching the first light-emitting unit 9 and the second light-emitting unit 10 complementarily, and the quenching period Toff for quenching both the first light-emitting unit 9 and the second light-emitting unit 10; and a PNM (Pulse Number Modulation) control unit 7 for executing light control of the first light-emitting unit 9 and the second light-emitting unit 10 by the PNM control in the fixed cycle TN.

Moreover, in the LED lighting device according to the present embodiment, the light/quench control unit 3 further executes the variable control of the ratio of the lighting period T1 of the first light-emitting unit 9 and the lighting period T2 of the second light-emitting unit 10 in the lighting period Ton according to the chromaticity control signal ST, and the PNM control unit 7 also executes the light control of the first light-emitting unit 9 and the second light-emitting unit 10 by the PNM control in the fixed cycle TN according to the chromaticity control signal ST.

As shown in FIG. 7A, the chromaticity control signal ST is supplied to the control circuit 6 via a color temperature control line TCL from a variable resistance for color temperature control RT connected to power supply voltage $V_T$, and the luminance control signal SI is supplied to the control circuit 6 via a luminance control line TCL from a variable resistance for luminance control RI connected to power supply voltage $V_I$.

The LED module 11 is composed as well as the output side of the control circuit 6 of FIG. 1, and includes the LED1 composed of the first light-emitting unit 9, the LED2 composed of the second light-emitting unit 10, and the bipolar transistors for driving LEDs Q1 and Q2 shown with the reference numeral 8. In FIG. 7A, although showing is omitted, the resistances R1 and R2 are connected as well as FIG. 1. Moreover, in FIG. 7A, although the configuration example which places two LED modules 11 is shown, it is not limited to two LED modules 11 and may be connected to more than three LED modules 11 in parallel.

Moreover, the variable resistance for luminance control RI and the variable resistance for color temperature control RT may be composed using which of volume resistance or sliding resistance.

As shown in FIG. 7B, the light/quench control unit 3 receives the chromaticity control signal ST and the luminance control signal SI, and outputs the switching control signals S1 and S2 composed of an ON/OFF signal by the PWM control. The PNM control unit 7 receives the chromaticity control signal ST and the luminance control signal SI, and outputs the PNM output signals PSI and PST by the PNM control, and the PNM output signals PSI and PST are superimposed on the switching control signal S1 and S2, respectively.

Figure 8:
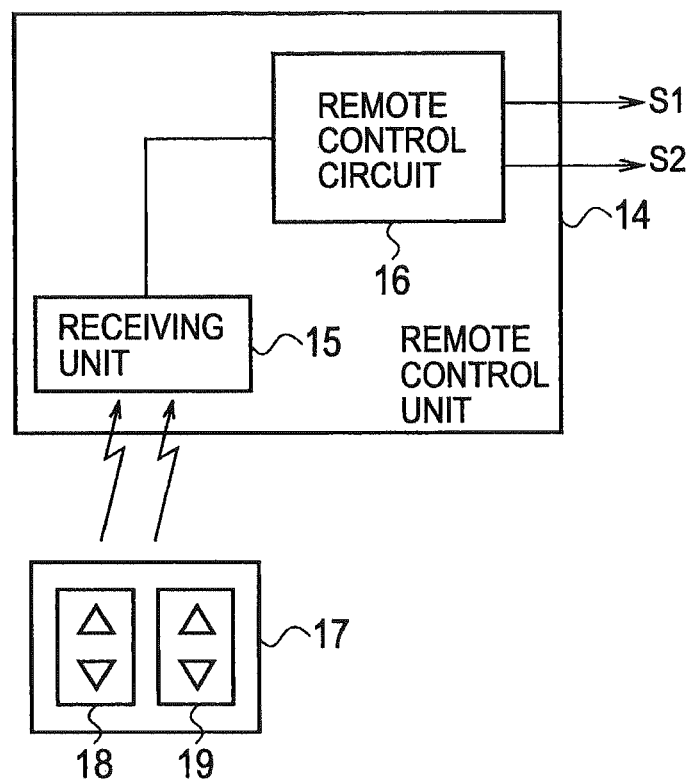
FIG. 8 It is a schematic block configuration diagram in the case of composing the control system for the LED module by a remote control system, in the LED lighting device according to the first embodiment of the present invention.

In the LED lighting device according to the present embodiment, a schematic block configuration in the case of composing a control system for the LED module 11 by a remote control system is expressed as shown in FIG. 8.

The remote control system includes a remote switch unit 17 having a remote switch 18 for luminance control and a remote switch 19 for color temperature control, and a remote control unit 14 having a receiving unit 15 and a remote control circuit 16. A control signal from the remote switch unit 17 is supplied to the receiving unit 15 in the remote control unit 14 as a radio frequency signal, and is further transferred to the remote control circuit 16 from the output terminal of the receiving unit 15, and the switching control signals S1 and S2 is output from the remote control circuit 16. In the remote control circuit 16, the light/quench control unit 3 and the PNM control unit 7 are included as well as FIG. 7B.

Figure 9:
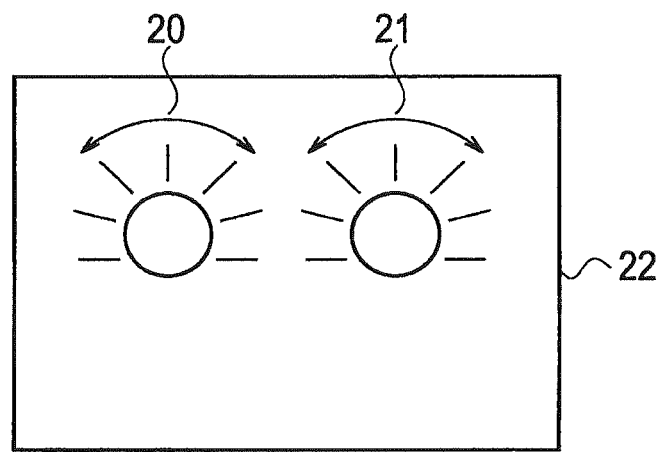
FIG. 9 It is a schematic diagram of a volume resistance control system composed of a volume resistance for luminance control (RVI) and a volume resistance for color temperature control (RVT), in the LED lighting device according to the first embodiment of the present invention.

A volume resistance control system for luminance control and color temperature control by a volume resistance unit 22 composed of a volume resistance for luminance control (RVI) 20 and a volume resistance for color temperature control (RVT) 21 is shown schematically, as shown in FIG. 9. The chromaticity control signal ST supplied to the control circuit 6 from the variable resistance for color temperature control RT connected to the power supply voltage $V_T$ and the luminance control signal SI supplied to the control circuit 6 from the variable resistance for luminance control RI connected to the power supply voltage $V_I$ are controllable by calibrating the RVI 20 and the RVT 21.

Figure 10A:
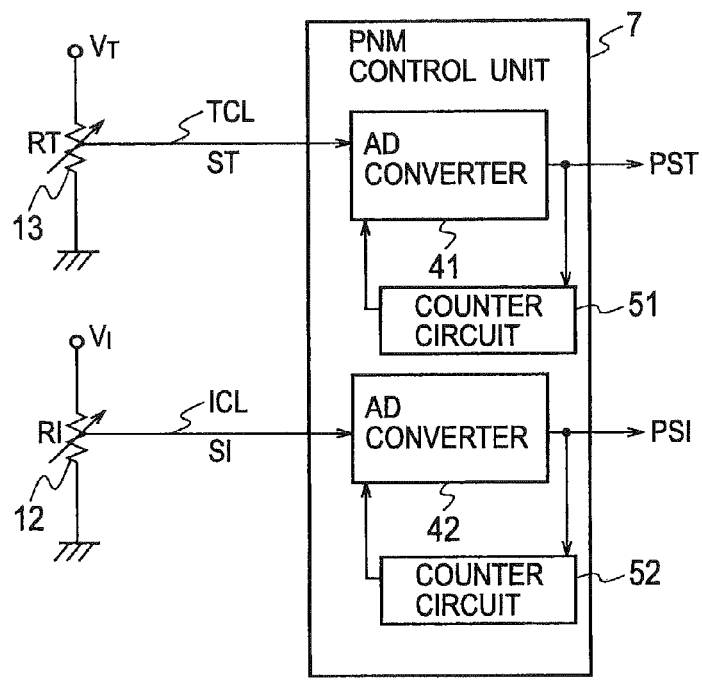
FIG. 10A It is a schematic circuit block configuration diagram for obtaining PNM output signals PST and PSI, in the LED lighting device according to the first embodiment of the present invention.

In the LED lighting device according to the present embodiment, a schematic circuit block configuration of the PNM control unit 7 for outputting the PNM output signals PST and PSI is expressed as shown in FIG. 10A. Moreover, a schematic waveform of the PNM output signal PST and the PNM output signal PSI is expressed as shown in FIG. 10B and FIG. 10C, respectively.

As shown in FIG. 10A, the chromaticity control signal ST is supplied to an AD converter 41, and the PNM output signal PST by which the PNM control is performed is output. A counter circuit 51 for counting the pulse number of the PNM output signal PST and being fed back to the AD converter is connected to the AD converter 41. Similarly, the luminance control signal SI is supplied to the AD converter 42, and the PNM output signal PSI by which the PNM control is performed is output. A counter circuit 52 for counting the pulse number of the PNM output signal PSI, and being fed back to the AD converter is connected to the AD converter 42.

Figure 10B:
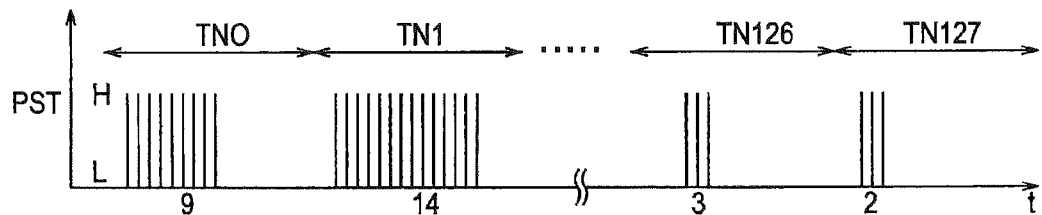
FIG. 10B It is a schematic waveform chart of a PNM output signal PST, in the LED lighting device according to the first embodiment of the present invention.

The PNM output signal PST by which the PNM control is performed in the chromaticity control signal ST is shown as a signal waveform modulated by the pulse number in the fixed cycle TN, for example, as shown in FIG. 10B. In the example of FIG. 10B, it is shown that the pulse number of nine pieces, fourteen pieces, ..., three pieces, and two pieces is modulated for the fixed cycle TN0, TN1, ..., TN126, and TN127, respectively.

Figure 10C:
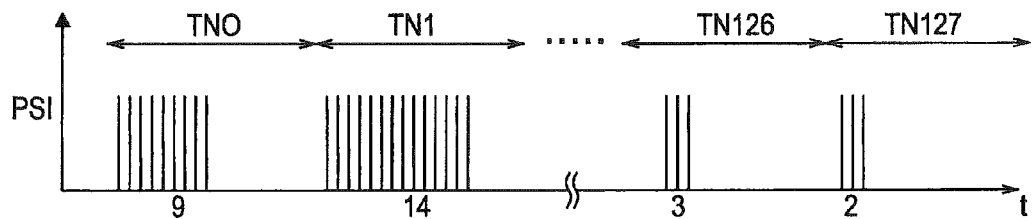
FIG. 10C It is a schematic waveform chart of a PNM output signal PSI, in the LED lighting device according to the first embodiment of the present invention.

Similarly, the PNM output signal PSI by which the PNM control is performed in the luminance control signal SI is shown as a signal waveform modulated by the pulse number in the fixed cycle TN, for example, as shown in FIG. 10C. Also in the example of FIG. 10C, although it is shown that the pulse number of nine pieces, fourteen pieces, ..., three pieces, and two pieces is modulated for the fixed cycle TN0, TN1, ..., TN126, and TN127, respectively, it does not limit to the example.

By the PNM output signals PST and PSI shown in FIG. 10B and FIG. 10C, the switching control signal S1 of the lighting period T1 of LED1 in the lighting period Ton accepts the PNM control, and increase and decrease in the pulse number in the fixed cycle TN are executed according to the PNM control, as described later. Similarly, by the PNM output signals PST and PSI shown in FIG. 10B and FIG. 10C, the switching control signal S2 of the lighting period T2 of LED2 in the lighting period Ton also accepts the PNM control, and increase and decrease in the pulse number in the fixed cycle TN are executed according to the PNM control, as described later.

Figure 11A:
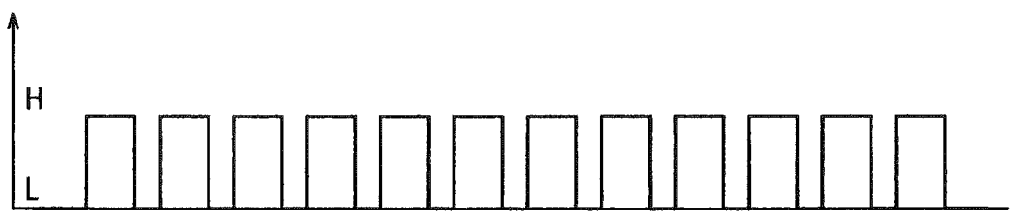
FIG. 11A It is an explanatory diagram of the PNM output signal, and is a PNM waveform chart in the case of obtaining 100% of luminosity, in the LED lighting device according to the first embodiment of the present invention.
Figure 11B:
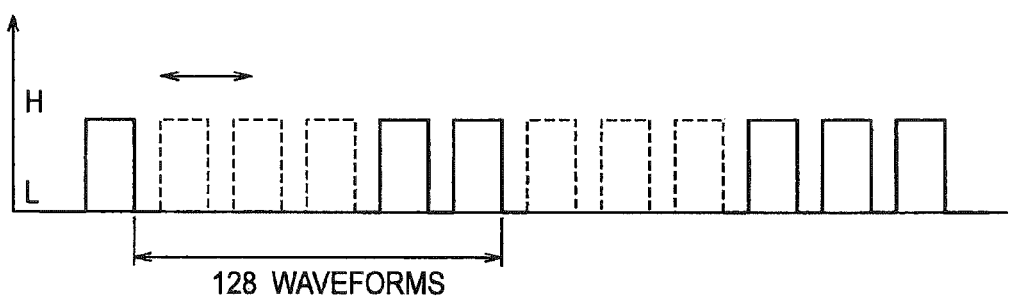
FIG. 11B It is a PNM waveform chart in the case of decreasing a plurality of pulse numbers, in the LED lighting device according to the first embodiment of the present invention.
Figure 11C:
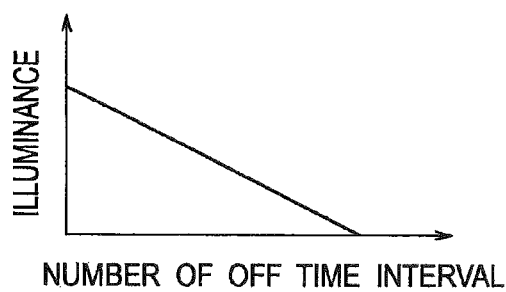
FIG. 11C It is a schematic diagram showing the relation between the illuminance and the number of OFF time interval of PNM, in the LED lighting device according to the first embodiment of the present invention.

FIG. 11 is an explanatory diagram of the PNM output signal in the LED lighting device according to the present embodiment. FIG. 11A shows an example of the PNM waveform in the case of obtaining 100% of luminosity, FIG. 11B shows an example of the PNM waveform in the case of decreasing a plurality of pulse numbers, and FIG. 11C is a schematic diagram showing the relation between the illuminance and the number of OFF time interval of PNM. 128 waveforms are made into one cycle (TN) in the example of FIG. 11. As shown in FIG. 11B, the luminosity can be changed by changing 0-128 waveform into the OFF time interval (state shown by a dotted line). Moreover, as compared with FIG. 11A, as shown by the arrow of FIG. 11B, the luminosity is convertible by making the OFF time interval increase and decrease.

The illuminance becomes 0 when the number of OFF time interval is increased and all 128 waveforms become the OFF time interval, as shown in FIG. 11C.

Moreover, the color temperature variation is achievable by changing the duty cycle ratio by the PWM control.

In the LED lighting device according to the present embodiment, the first light emitting diode LED1 and the second light emitting diode LED2 may be placed by mutually adjoining.

Moreover, in the LED lighting device according to the first embodiment of the present invention, the first light emitting diode LED1 and the second light emitting diode LED2 are placed by mutually adjoining, and may be mounted by arraying a plurality of pairs.

Figure 12:
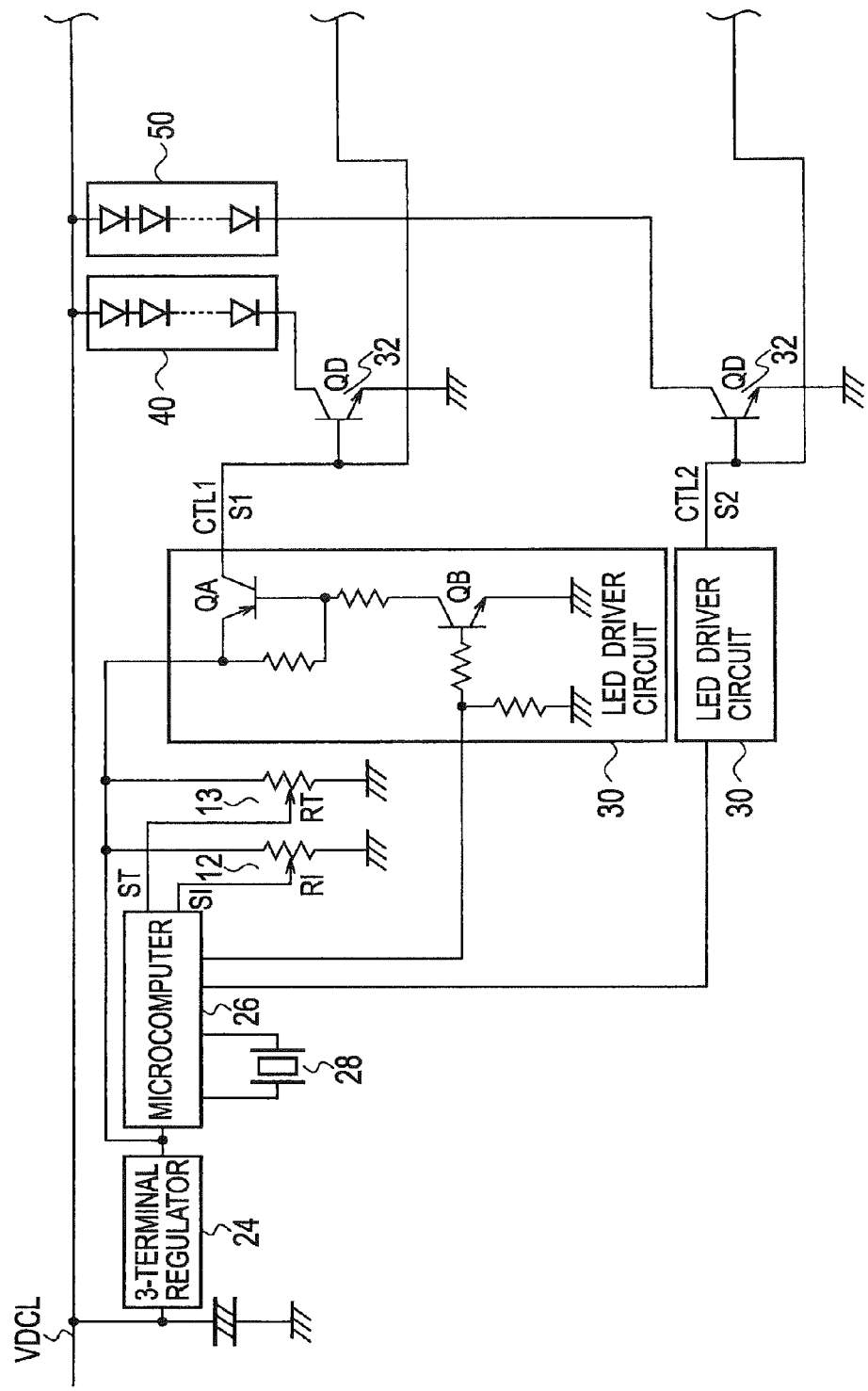
FIG. 12 It is a schematic circuit block configuration diagram of an LED drive circuit system in the case of mounting by adjoining two LED columns from which a color temperature differs, in the LED lighting device according to the first embodiment of the present invention.

In the LED lighting device according to the present embodiment, a schematic circuit block configuration of the LED drive circuit system in the case of mounting by adjoining the first LED column 40 and the second LED column 50 which differ in the color temperature is expressed as shown in FIG. 12.

The LED drive circuit system shown in FIG. 12 includes: 3-terminal regulator 24 connected to a power supply line VDCL; a microcomputer 26 connected to the 3-terminal regulator 24 and for outputting the luminance control signal SI and the chromaticity control signal ST; an LED driver circuit 30 composed of the bipolar transistors QA and QB, and for supplying the switching control signal S1 to a control line CTL1; a bipolar transistor 32 for driving LED column connected to the control line CTL1 and for driving a first LED column 40; an LED driver circuit 30 composed of the bipolar transistors QA and QB, and for supplying the switching control signal S2 to a control line CTL2; and a bipolar transistor 32 for driving LED column connected to the control line CTL2 and driving a second LED column 50.

A clock signal is supplied to the microcomputer 26 from a crystal resonator 28, and the luminance control signal SI is supplied to the microcomputer 26 via a variable resistance for luminance control (RI) 12, and the chromaticity control signal ST is supplied to the microcomputer 26 via a variable resistance for color temperature control (RT) 13, respectively.

The microcomputer 26 shown in FIG. 12 executes the function equivalent to the control circuit 6 shown in FIG. 1 and FIG. 7.

Moreover, in the LED lighting device according to the present embodiment, a schematic circuit block configuration in the case of mounting by adjoining two LED columns from which the color temperature differs, and arraying an n-pairs is expressed as shown in FIG. 13.

FIG. 13 shows: first LED columns 40-1, 40-2, ..., 40-n placed between the power supply line VDCL and the control line CTL1; second LED columns 50-1, 50-2, ..., 50-n placed between the power supply line VDCL and the control line CTL2; and a ground line GNDL.

In the LED lighting device according to the present embodiment, as shown in FIG. 13, it can be achieved that the circuit configuration in the case of making adjoining two LED columns from which the color temperature differs and arraying an n-pairs can be extended similarly by applying the schematic circuit block configuration of the LED drive circuit system shown in FIG. 12.

Figure 14B:
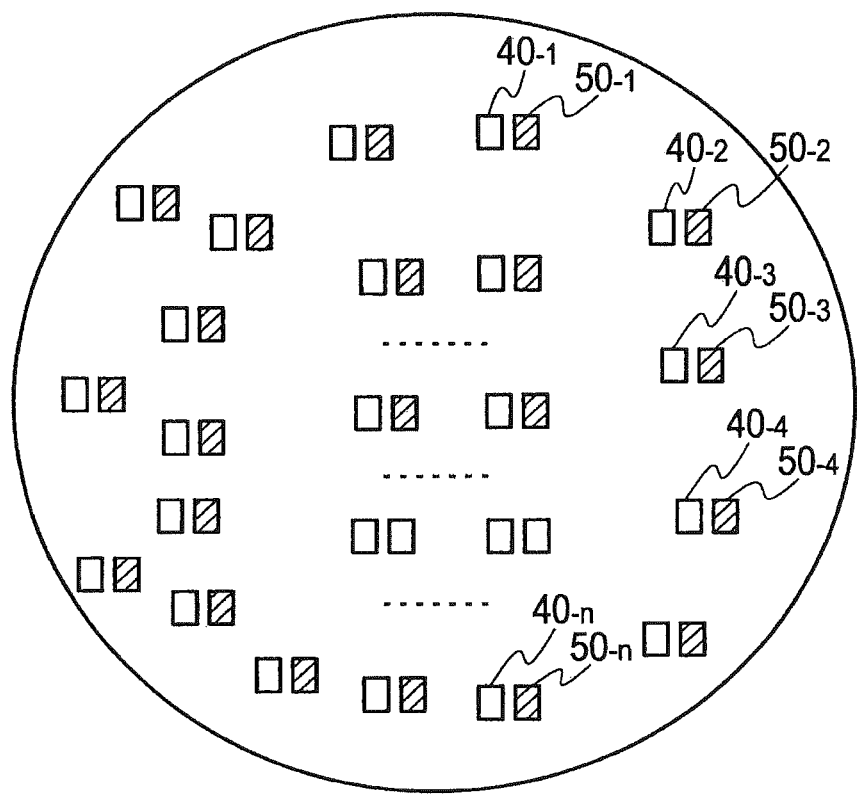
FIG. 14B It is a schematic layout drawing in the case of mounting by adjoining two LED columns from which a color temperature differs, and arraying n-pairs, and is a configuration diagram of the LED lighting device of circle shape, in the LED lighting device according to the first embodiment of the present invention.

In the LED lighting device according to the present embodiment, FIG. 14A is a schematic layout drawing in the case of mounting by placing adjacently two LED columns from which the color temperature differs and arraying an n-pairs, and shows a configuration diagram of the LED lighting device of line shape, and FIG. 14B shows a configuration diagram of the LED lighting device of circle shape.

In the LED lighting device according to the present embodiment, as shown in FIG. 14A, the first light emitting diode LED1 and the second light emitting diode LED2 are mounted by placing mutually adjoining and arraying a plurality of pairs in the line shape.

Moreover, in the LED lighting device according to the present embodiment, as shown in FIG. 14B, the first light emitting diode and the second light emitting diode are mounted by placing mutually adjoining, and arraying a plurality of pairs in the circle shape.

It can be made easy to mix in the light emitted from each the LEDs, and the variation and the non-uniformity in the color on the surface of illuminating can be reduced, by mounting by adjoining the LEDs from which the color temperature differs.

In particular, in FIG. 14A, the non-uniformity of the luminosity in the illuminating surface can be reduced by all making the distance A fixed. It is also possible by placing one reflector for two LED1 and LED2 to make the light concentrate efficiently for still more arbitrary locations, and to raise the illuminance.

In the LED lighting device according to the present embodiment, the LED drive circuit system is divided into two, a control circuit unit and a LED module unit. The control circuit unit reads the DC voltage arbitrarily occurred in the variable resistance, and the PWM signal according to it is outputted. The output PWM signal can turn ON and turn OFF the bipolar transistors for driving LEDs Q1 and Q2 (QD) of the LED module unit, respectively, and can light/quench the LEDs. The control of plenty of the LED modules is achieved in one control circuit, and increase and decrease in the LED module unit are possible according to the size of the set to be used.

In the LED lighting device according to the present embodiment, it makes possible 0 to 100% of brightness variable by removing the ON waveform of the lighting period T1 and T2 by the PNM control.

Figure 15A:
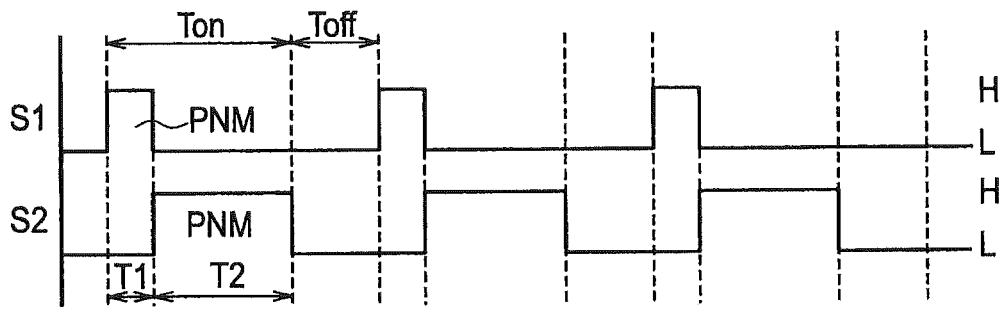
FIG. 15A It is a drawing for explaining a chromaticity control operation of illumination light, and is an example of T1<T2 for the lighting period Ton (=T1+T2), in the LED lighting device according to the first embodiment of the present invention.
Figure 15B:
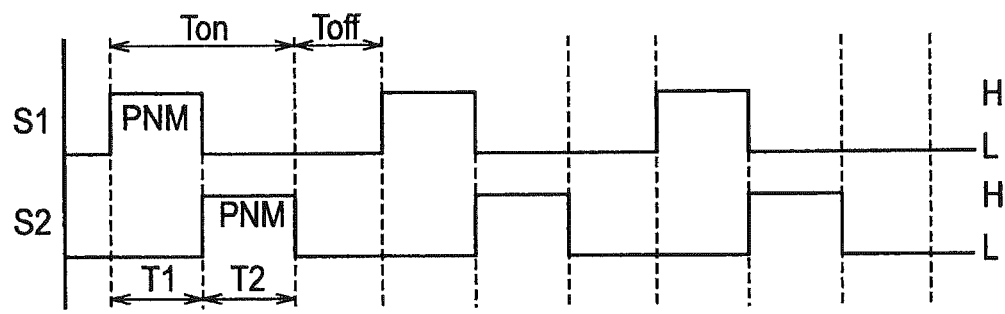
FIG. 15B It is a drawing for explaining the chromaticity control operation of the illumination light, and is an example of T1=T2, in the LED lighting device according to the first embodiment of the present invention.
Figure 15C:
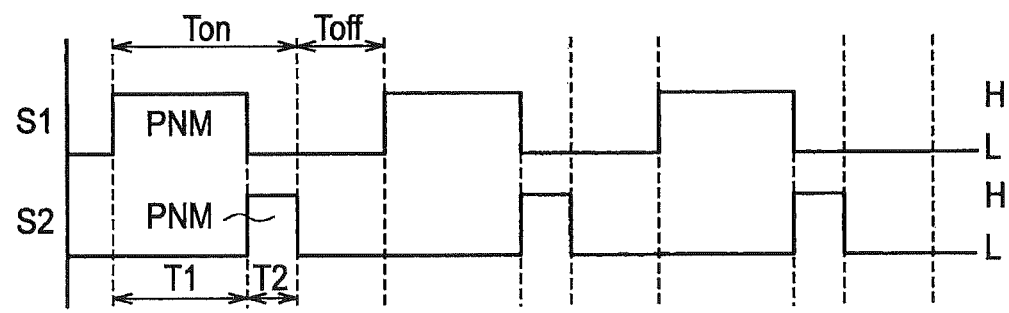
FIG. 15C It is a drawing for explaining the chromaticity control operation of the illumination light, and is an example of T1>T2, in the LED lighting device according to the first embodiment of the present invention.

FIG. 15A is a drawing for explaining a chromaticity control operation of the illumination light in the LED lighting device according to the present embodiment, and shows an example of T1<T2 for the lighting period Ton (=T1+T2). Moreover, FIG. 15B shows an example of T1=T2, and FIG. 15C shows an example of T1>T2.

The chromaticity control operation (color temperature control operation) of the illumination light by the control circuit 6 will be explained in detail, referring to FIG. 15. In addition, the reference numerals S1 and S2 of FIGS. 15A to C show the logical state of the switching control signals S1 and S2, i.e., the light/quench state of LED1 and LED2, respectively.

In the LED lighting device according to the present embodiment, as shown in FIG. 15, the control circuit 6 executes the variable control of the ratio between the lighting period T1 of the first light-emitting unit 9 and the lighting period T2 of the second light-emitting unit 10 in the lighting period Ton, according to the chromaticity control signal ST, and executes the light control of the first light-emitting unit 9 and the second light-emitting unit 10 by the PNM control in the fixed cycle TN.

The control circuit 6 executes the cyclic light/quench control of the LED1 and LED2 so as to have the lighting period Ton for lighting/quenching the LED1 composing the first light-emitting unit 9 and the LED2 composing the second light-emitting unit 10 complementarily (that is, so that both of on duty cycles may be 100% in total) and the quenching period Toff for quenching both the LED1 and LED2.

Moreover, as for the ON waveform of the lighting periods T1 of LED1 and the lighting period T2 of LED2 in the lighting period Ton, the pulse number within the fixed period decreases by also the PNM control, and the OFF period can be completely set to 0 and the luminance is calibratable to 0.

Moreover, the control circuit 6 executes the variable control of the ratio between the lighting periods T1 of LED1 and the lighting period T2 of LED2 in the lighting period Ton, according to the inputted chromaticity control signal ST. More specifically, what is necessary is just to raise the ratio (the on duty cycle of the second light-emitting unit LED2) which the lighting period T2 of the second light-emitting unit LED2 occupies for the lighting period Ton one after another when reducing the color temperature of the illumination light (FIG. 15C→FIG. 15B→FIG. 15A). On the other hand, what is necessary is just to reduce the on duty cycle of the second light-emitting unit LED2 one after another when raising the color temperature of the illumination light (FIG. 15A→FIG. 15B→FIG. 15C).

Figure 16:
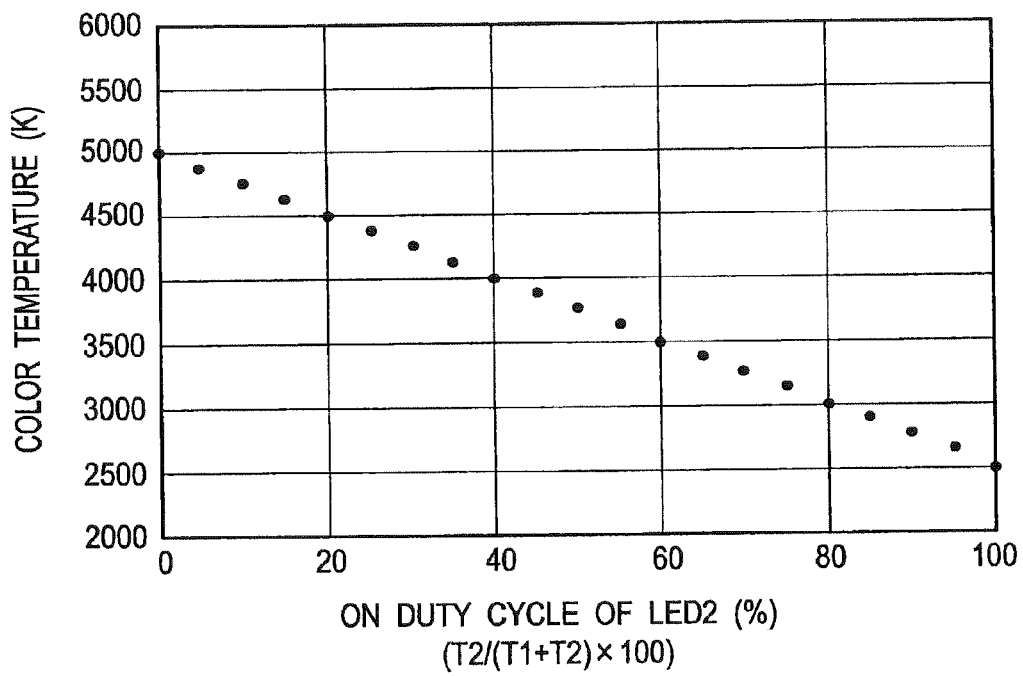
FIG. 16 It is a drawing for explaining color temperature variation according to the ratio which a lighting period T2 of LED2 occupies for the lighting period Ton (=T1+T2), in the LED lighting device according to the first embodiment of the present invention.
Figure 17:
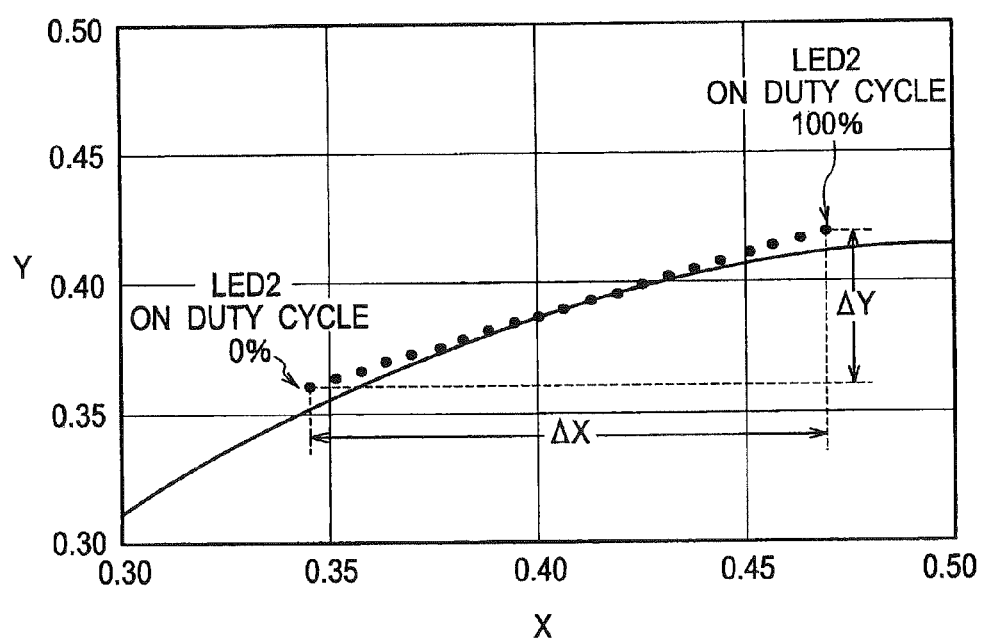
FIG. 17 It is a chromaticity diagram for explaining the chromaticity variation according to the ratio which the lighting period T2 of LED2 occupies for the lighting period Ton (=T1+T2), and the full line shows the black body radiation curve, in the LED lighting device according to the first embodiment of the present invention.

FIG. 16 is a drawing for explaining the color temperature variation according to the ratio which the lighting period T2 of LED2 occupies for the lighting period Ton (=T1+T2), in the LED lighting device according to the present embodiment. On the other hand, FIG. 17 is a chromaticity diagram for explaining the chromaticity variation according to the ratio which the lighting period T2 of LED2 occupies for the lighting period Ton (=T1+T2). The full line in FIG. 17 shows the black body radiation curve.

As shown in FIG. 16, according to the LED lighting device according to the present embodiment, it becomes possible to calibrate the color temperature of the illumination light continuously from the color temperature (for example, 5000K) of LED1 to the color temperature (for example, 2600K) of LED2.

Moreover, about the chromaticity of the illumination light, as shown in FIG. 17, it becomes possible to obtain about 0.06 to 0.14 of wide calibratable range on a chromaticity coordinate. That is, in the coordinates of the on duty cycle 100% and 0% of LED2, it becomes possible to obtain wide calibratable range of about 0.14 in range $\Delta X$ of the value of X, and about 0.06 in range $\Delta Y$ of the value of Y.

Moreover, in the LED lighting device according to the present embodiment, since it becomes possible to make the luminosity into 0 to 100%, the application range of a lighting apparatus becomes wide.

The lighting period Ton is set up about the color temperature variable to light/quench the LED1 and LED2 from which the color temperature differs complementarily (so that both the on duty cycle may be 100% in total).

Moreover, the luminosity can be variable by making the repetition 128 waveform of the lighting period Ton into the one cycle TN, and turning OFF the 0 to 128 waveform by the PNM control.

For example, although the luminosity is 100% if no waveforms are removed, the luminosity becomes 50%, i.e. a half, if 64 waveforms are removed and that is turned OFF. The luminosity will be 0% if all for 128 waveforms are made into the OFF time interval. Accordingly, it becomes possible to change the luminosity in 128 steps and to change the luminosity into 0 to 100%.

Therefore, according to the LED lighting device according to the present embodiment, it becomes possible to perform white lighting of various color tones by one module, and the calibratable range of illuminance is also as wide range as 0 to 100%.

Moreover, according to the LED lighting device according to the present embodiment, the light/quench control is performed so that the on duty cycle of LED1 and LED2 may be set to 100(%) in total. Therefore, since lighting always when seeing as the whole lighting period Ton even if it performs the variable control of the ratio between the lighting periods T1 of LED1 and the lighting period T2 of LED2 in the lighting period Ton, it becomes possible to keep the luminosity of the illumination light constant.

According to the present embodiment, it can provide the LED lighting device calibratable to 0 to 100% of wide range about the chromaticity and the luminance of the illumination light by the simple configuration.

Second Embodiment

An LED lighting device according to a second embodiment of the present invention is only that the timing chart of the chromaticity control operation and luminance control operation differs from the LED lighting device according to the first embodiment, and the fundamental circuit configuration is the same as that of FIG. 1. Moreover, a detailed circuit configuration is also the same as that of FIG. 7A to FIG. 10C. The PNM control is applied as well as the LED lighting device according to the first embodiment.

Moreover, as shown in FIG. 12 to FIG. 14B, it is the same as that of the LED lighting device according to the first embodiment about a circuit block configuration of the LED drive circuit system in the case of mounting by adjoining two LED columns from which the color temperature differs, a circuit block configuration in the case of mounting by adjoining two LED columns from which the color temperature differs, and arraying the n-pairs, etc. Accordingly, the explanation which duplicates with the LED lighting device according to the first embodiment is omitted.

The LED lighting device according to the present embodiment also includes a first light-emitting unit 9 and a second light-emitting unit 10 from which a color temperature differs mutually, and a control circuit 6 for executing light/quench control of the first light-emitting unit 9 and the second light-emitting unit 10, as well as the first embodiment shown in FIG. 1.

The control circuit 6 executes a cyclic light/quench control of the first light-emitting unit 9 and the second light-emitting unit 10 so as to have the lighting period Ton for lighting/quenching the first light-emitting unit 9 and the second light-emitting unit 10 complementarily and the quenching period Toff for quenching both the first light-emitting unit 9 and the second light-emitting unit 10, and executes a light control of the first light-emitting unit 9 and the second light-emitting unit 10 by the PNM control in the fixed cycle TN.

Moreover, the control circuit 6 executes a variable control of the length of the quenching period Toff according to the luminance control signal SI, whereas the length of the lighting period Ton is kept up uniformly, and executes a light control of the first light-emitting unit 9 and the second light-emitting unit 10 by the PNM control in the fixed cycle TN.

More specifically, the LED lighting device according to the present embodiment includes a first light-emitting unit 9 and a second light-emitting unit 10 from which a color temperature differs mutually, and a control circuit 6 for executing light/quench control of the first light-emitting unit 9 and the second light-emitting unit 10, as well as the first embodiment shown in FIG. 7A.

The control circuit 6 includes a light/quench control unit 3 for executing the cyclic light/quench control of the first light-emitting unit 9 and the second light-emitting unit 10 so as to have the lighting period Ton for lighting/quenching the first light-emitting unit 9 and the second light-emitting unit 10 complementarily and the quenching period Toff for quenching both the first light-emitting unit 9 and the second light-emitting unit 10, and a PNM control unit 7 for executing the light control of the first light-emitting unit 9 and the second light-emitting unit 10 by the PNM control in the fixed cycle TN, as well as the first embodiment shown in FIG. 7B.

Figure 18A:
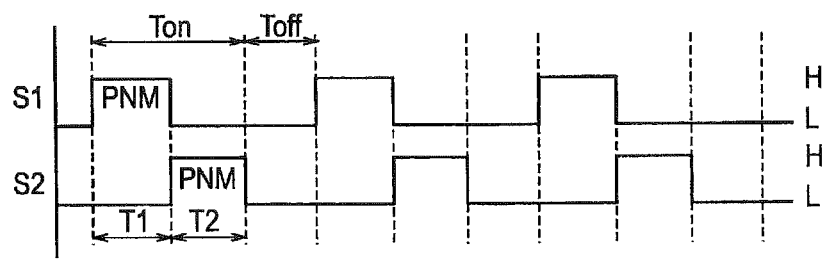
FIG. 18A It is a drawing for explaining an example of luminance control operation of the illumination light in an LED lighting device according to a second embodiment of the present invention, and is a drawing for explaining an aspect that it keeps up the length of the lighting period Ton uniformly, performs variable control of the length of the quenching period Toff according to a luminance control signal, sets up the quenching period Toff long one after another when reducing the luminance of the illumination light, and sets up the quenching period Toff short one after another when raising the luminance of the illumination light.
Figure 18B:
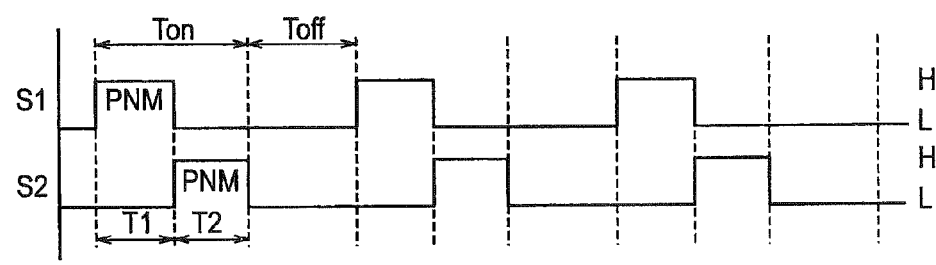
FIG. 18B It is an operation explanatory diagram in the case of setting up the quenching period Toff longer than FIG. 18A.
Figure 18C:
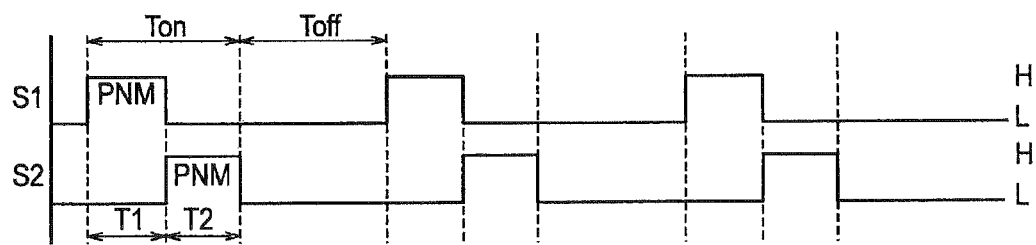
FIG. 18C It is an operation explanatory diagram in the case of setting up the quenching period Toff longer than FIG. 18B.

FIG. 18A to FIG. 18C show drawings for explaining an example of the luminance control operation of the illumination light, in the LED lighting device according to the present embodiment. The reference numerals S1 and S2 of FIGS. 18A to C show the logical state of the switching control signals S1 and S2, i.e., the light/quench state of LED1 and LED2, respectively.

When performing the variable control of the length of the quenching period Toff according to the luminance control signal whereas the length of the lighting period Ton is kept up uniformly, and reducing the luminance of the illumination light, the quenching period Toff is set up long one after another (FIG. 18A→FIG. 18B→FIG. 18C). When raising the luminance of the illumination light, the quenching period Toff is set up short one after another (FIG. 18C→FIG. 18B→FIG. 18A).

As shown in FIG. 18A to FIG. 18C, the luminance of the illumination light becomes low as the quenching period Toff long, and the luminance of the illumination light becomes high conversely as the quenching period Toff is short.

In the LED lighting device according to the present embodiment, as shown in FIG. 18A to FIG. 18C, the light/quench control unit 3 further executes the variable control of the length of the quenching period Toff according to the luminance control signal SI whereas the length of the lighting period Ton is kept up uniformly, and the PNM control unit 7 also further executes the light control of the first light-emitting unit 9 and the second light-emitting unit 10 by the PNM control in the fixed cycle TN according to the luminance control signal SI.

Figure 19:
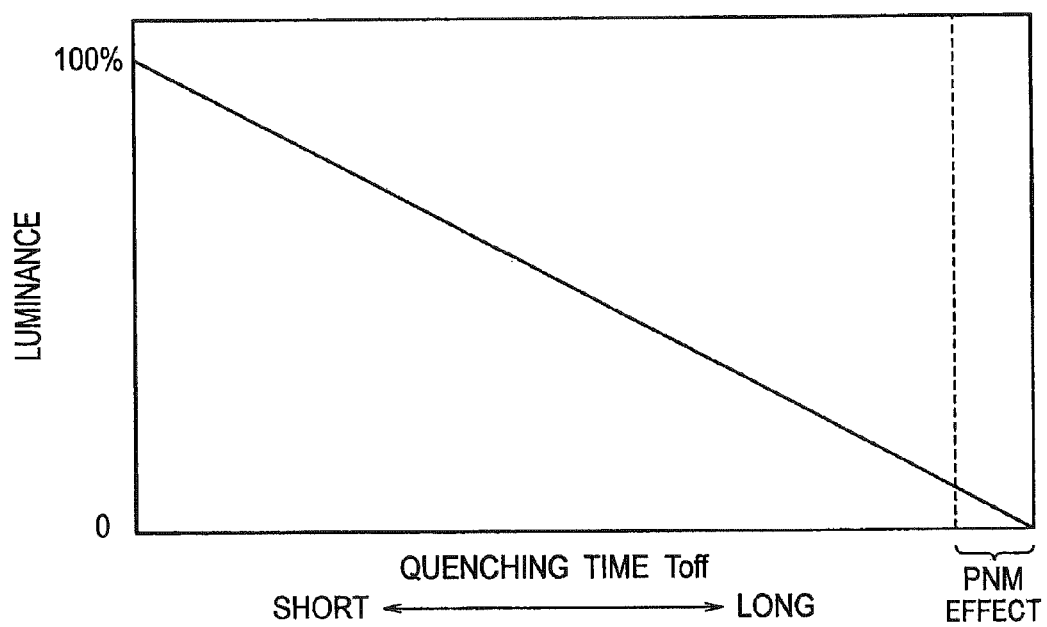
FIG. 19 It is a drawing for explaining the effect of the luminance variation and PNM (Pulse Number Modulation) control according to the length of the quenching period Toff, in the LED lighting device according to the second embodiment of the present invention.

FIG. 19 is a drawing for explaining the luminance variation according to the length of the quenching period Toff, in the LED lighting device according to the present embodiment.

In FIG. 19, although the range from the zero on a horizontal axis to a dotted line is an example making the duty cycle ratio variable by the PWM control which makes the quenching period Toff variable, it cannot make the luminance 0% completely. On the other hand, by applying the PNM control for ON the waveform of the lighting periods T1 of LED1 and the lighting period T2 of LED2 in the lighting period Ton, the pulse number in the fixed cycle TN is reduced, it can set the OFF period to 0 completely, and it is calibratable to 0 in the luminance (PNM effect).

In the LED lighting device according to the present embodiment, as for the ON waveform of the lighting periods T1 of LED1 and the lighting period 12 of LED2 in the lighting period Ton, the pulse number in the fixed cycle TN is reduced by the PNM control, it can set the OFF period to 0 completely, and it is calibratable to 0 in the luminance, as well as the first embodiment.

According to the present embodiment, it can provide the LED lighting device calibratable to 0 to 100% of wide range about the chromaticity and the luminance of the illumination light by the simple configuration.

Third Embodiment

An LED lighting device according to a third embodiment of the present invention is only that the timing charts of the chromaticity control operation and luminance control operation differ from the LED lighting device according to the first embodiment, and the fundamental circuit configuration is the same as that of FIG. 1. Moreover, a detailed circuit configuration is also the same as that of FIG. 7A to FIG. 10C. Furthermore, the PNM control is applied as well as the LED lighting device according to the first embodiment.

Moreover, as shown in FIG. 12 to FIG. 14B, it is the same as that of the LED lighting device according to the first embodiment about a circuit block configuration of the LED drive circuit system in the case of mounting by adjoining two LED columns from which the color temperature differs, a circuit block configuration in the case of mounting by adjoining two LED columns from which the color temperature differs, and arraying the n-pairs, etc. Accordingly, the explanation which duplicates with the LED lighting device according to the first embodiment is omitted.

The LED lighting device according to the present embodiment also includes a first light-emitting unit 9 and a second light-emitting unit 10 from which a color temperature differs mutually, and a control circuit 6 for executing light/quench control of the first light-emitting unit 9 and the second light-emitting unit 10, as well as the first embodiment shown in FIG. 1.

The control circuit 6 executes a cyclic light/quench control of the first light-emitting unit 9 and the second light-emitting unit 10 so as to have the lighting period Ton for lighting/quenching the first light-emitting unit 9 and the second light-emitting unit 10 complementarily and the quenching period Toff for quenching both the first light-emitting unit 9 and the second light-emitting unit 10, and executes a light control of the first light-emitting unit 9 and the second light-emitting unit 10 by the PNM control in the fixed cycle TN.

More specifically, the LED lighting device according to the present embodiment includes a first light-emitting unit 9 and a second light-emitting unit 10 from which a color temperature differs mutually, and a control circuit 6 for executing light/quench control of the first light-emitting unit 9 and the second light-emitting unit 10, as well as the first embodiment shown in FIG. 7A.

The control circuit 6 includes a light/quench control unit 3 for executing the cyclic light/quench control of the first light-emitting unit 9 and the second light-emitting unit 10 so as to have the lighting period Ton for lighting/quenching the first light-emitting unit 9 and the second light-emitting unit 10 complementarily and the quenching period Toff for quenching both the first light-emitting unit 9 and the second light-emitting unit 10, and a PNM control unit 7 for executing the light control of the first light-emitting unit 9 and the second light-emitting unit 10 by the PNM control in the fixed cycle TN, as well as the first embodiment shown in FIG. 7B.

Figure 20A:
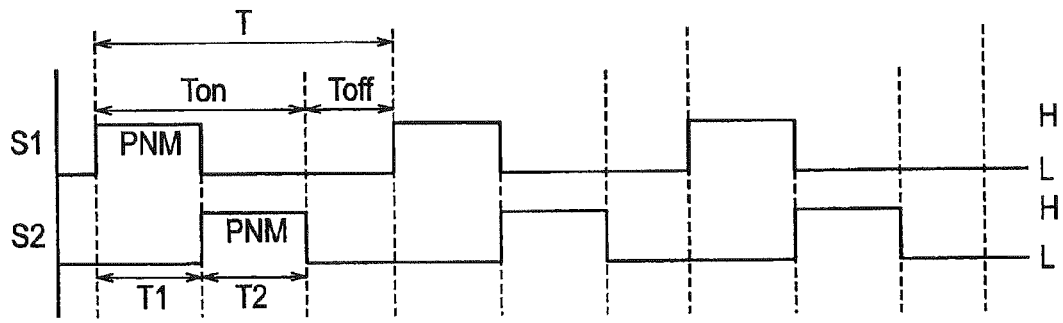
FIG. 20A It is a drawing for explaining another example of luminance control operation of the illumination light in the LED lighting device according to a third embodiment of the present invention, and is a drawing for explaining an aspect that it performs variable control of the ratio between the lighting period Ton and the quenching period Toff in the predetermined lighting/quenching cycle T according to a luminance control signal, sets up to reduces the ratio (total of on duty cycle which combines a first light-emitting unit LED1 and a second light-emitting unit LED2) which the lighting period Ton occupies for the lighting/quenching cycle T one after another when reducing the luminance of the illumination light, and sets up to raise a total of on duty cycle when raising the luminance of the illumination light conversely one after another.
Figure 20B:
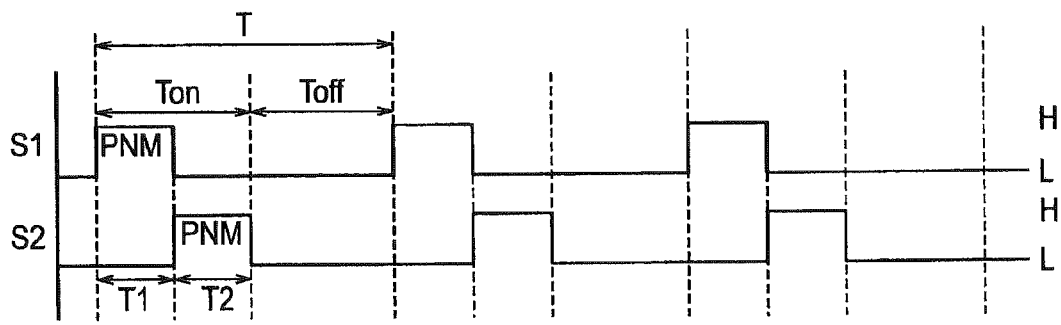
FIG. 20B It is an operation explanatory diagram in the case of setting up to reduce the total of on duty cycle rather than FIG. 20A.
Figure 20C:
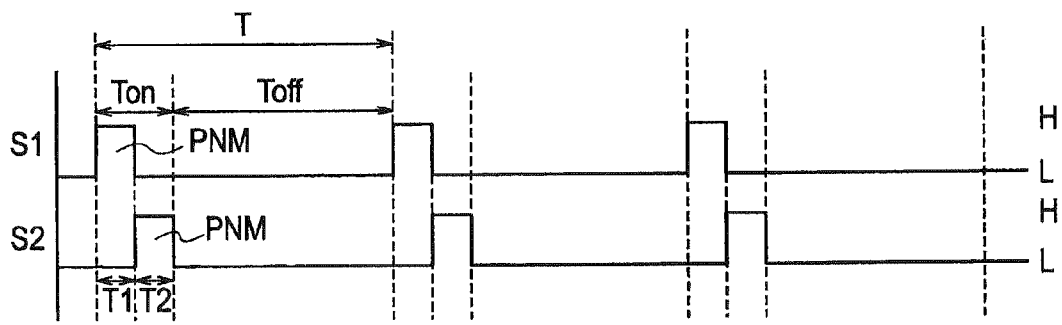
FIG. 20C It is an operation explanatory diagram in the case of setting up to reduce the total of on duty cycle rather than FIG. 20B.

FIG. 20A to FIG. 20C show drawings for explaining an example of the luminance control operation of the illumination light, in the LED lighting device according to the third embodiment of the present invention. The reference numerals S1 and S2 of FIG. 20A to FIG. 20C show the logical state of the switching control signals S1 and S2, i.e., the light/quench state of LED1 and LED2, respectively.

When performing the variable control of the ratio between the lighting period Ton and the quenching period Toff in the predetermined lighting/quenching cycle T according to the luminance control signal SI, and reducing the luminance of the illumination light, the ratio (total of the on duty cycle combining the first light-emitting unit LED1 and the second light-emitting unit LED2) which the lighting period Ton occupies for the lighting/quenching cycle T is set up to reduce one after another (FIG. 20A→FIG. 20B→FIG. 20C). On the other hand, when raising the luminance of the illumination light, the total of the on duty cycle is set up to raise one after another (FIG. 20C→FIG. 20B→FIG. 20A).

In the LED lighting device according to the present embodiment, as shown in FIG. 20, the light/quench control unit 3 further executes the variable control of the ratio between the lighting period Ton and the quenching period Toff in the predetermined lighting/quenching cycle T, according to the luminance control signal SI and the PNM control unit 7 also further executes the light control of the first light-emitting unit 9 and the second light-emitting unit 10 by the PNM control in the fixed cycle TN according to the luminance control signal SI.

Figure 21:
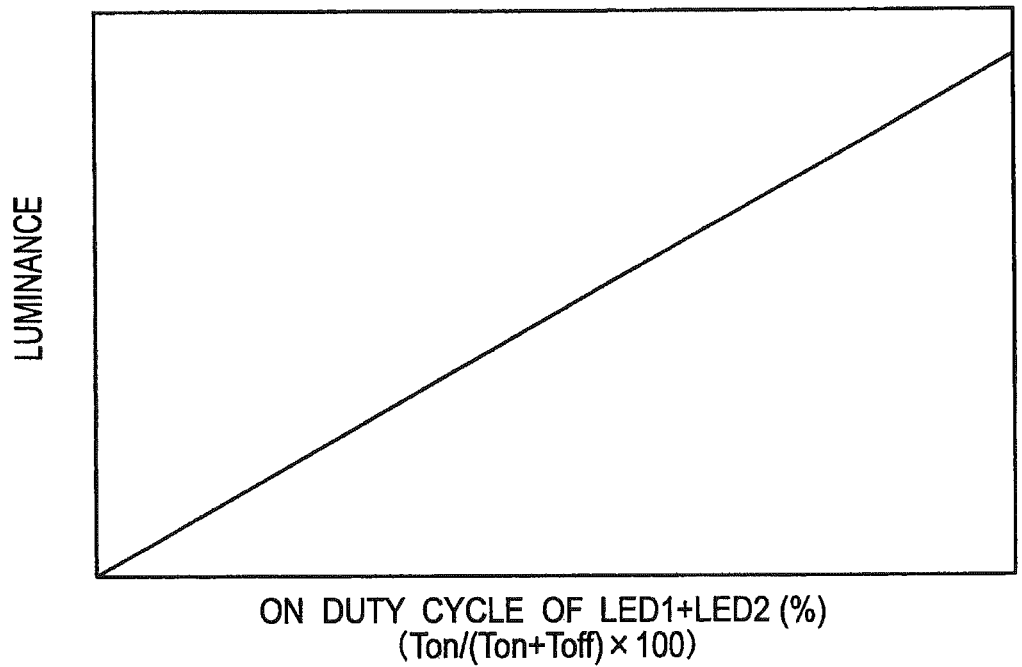
FIG. 21 It is a drawing for explaining the luminance variation according to the ratio which the lighting period Ton occupies for the lighting/quenching cycle T, in the LED lighting device according to the third embodiment of the present invention.

FIG. 21 is a drawing for explaining the luminance variation according to the ratio which the lighting period Ton occupies for the lighting/quenching cycle T, in the LED lighting device related to the present embodiment.

As shown in FIG. 21, the luminance of the illumination light becomes low as the total of the on duty cycle is low, and the luminance of the illumination light becomes higher as the total of the on duty cycle is high conversely.

In addition, what is necessary is just to set to the length which does not perceive a blinking with the naked eye about the above-mentioned lighting/quenching cycle T (for example, about several 100 ms).

In the LED lighting device according to the present embodiment, as for the ON waveform of the lighting periods T1 of LED1 and the lighting period T2 of LED2 in the lighting period Ton, the pulse number in the fixed cycle TN is reduced by the PNM control, it can set the OFF period to 0 completely, and it is calibratable to 0 in the luminance, as well as the first embodiment.

In the LED lighting device according to the present embodiment, it becomes possible to calibrate the chromaticity of the illumination light arbitrarily, without affecting the luminance of the illumination light at all, by selecting suitably the ratio between the lighting periods T1 of LED1 and the lighting period T2 of LED2 in the lighting period Ton. Furthermore, it becomes possible to calibrate the luminance of the illumination light arbitrarily, without affecting the chromaticity of the illumination light at all, by selecting suitably the length of the quenching period Toff, or the ratio between the lighting period Ton and the quenching period Toff in the lighting/quenching cycle T.

Moreover, in the LED lighting device according to the present embodiment, since the chromaticity control and the luminance control of the illumination light are not accompanied by the driving current control of LED1 and LED2, it becomes possible to achieve control in the control circuit 6 easily.

According to the present embodiment, it can provide the LED lighting device calibratable to 0 to 100% of wide range about the chromaticity and the luminance of the illumination light by the simple configuration.

Fourth Embodiment

LED Lighting Device

It is only that an LED lighting device according to a fourth embodiment of the present invention differs from the LED lighting device according to the first to third embodiment at the point of not changing the duty cycle ratio linearly for the numerical value of reading of the A/D converter built in the microcomputer, but changing the value of the duty cycle by giving a certain variable for the reading value of the A/D converter so that the difference of the inverse correlated color temperature may become linear. The fundamental circuit configuration is the same as that of FIG. 1, and the detailed circuit configuration is also the same as that of FIG. 7A to FIG. 10C. Furthermore, the PNM control is applied as well as the LED lighting device according to the first to third embodiment.

Moreover, as shown in FIG. 12 to FIG. 14B, it is the same as that of the LED lighting device according to the first embodiment about a circuit block configuration of the LED drive circuit system in the case of mounting by adjoining two LED columns from which the color temperature differs, a circuit block configuration in the case of mounting by adjoining two LED columns from which the color temperature differs, and arraying the n-pairs, etc. Accordingly, the explanation which duplicates with the LED lighting device according to the first to third embodiment is omitted.

The LED lighting device according to the present embodiment includes a first light-emitting unit 9 and a second light-emitting unit 10 from which a color temperature differs mutually, and a control circuit 6 for executing light/quench control of the first light-emitting unit 9 and the second light-emitting unit 10, as well as the first embodiment shown in FIG. 1.

The control circuit 6 executes a cyclic light/quench control of the first light-emitting unit 9 and the second light-emitting unit 10 so as to have the lighting period Ton for lighting/quenching the first light-emitting unit 9 and the second light-emitting unit 10 complementarily and the quenching period Toff for quenching both the first light-emitting unit 9 and the second light-emitting unit 10, and executes a light control of the first light-emitting unit 9 and the second light-emitting unit 10 by the PWM control or the PNM control in the fixed cycle TN.

The chromaticity control signal ST and the luminance control signal SI are supplied to the control circuit 6, and the control circuit 6 supplies the switching control signals S1 and S2 to the base of bipolar transistors for driving LEDs Q1 and Q2, respectively. Moreover, the resistances R1 and R2 are connected to the LED1 and the LED2 in series, respectively, and are achieved so as to flow the fixed current.

In the LED lighting device according to the present embodiment, the duty cycle ratio is not linearly changed for the numerical value of reading of the A/D converter built in the microcomputer composing the control circuit 6, and the value of the duty cycle (%) is changed by giving a certain variable for the numerical value read by the A/D converter so that the difference of the inverse correlated color temperature of the first light-emitting unit 9 and the second light-emitting unit 10 may become linear.

Therefore, in the LED lighting device according to the present embodiment, the chromaticity control signal ST and the luminance control signal SI are supplied to the control circuit 6, and the switching control signals S1 and S2 for controlling the value of the duty cycle (%) are supplied to the base of the bipolar transistors for driving LEDs Q1 and Q2, respectively, from the control circuit 6 so that the difference of the inverse correlated color temperature of the first light-emitting unit 9 and the second light-emitting unit 10 may become linear.

In the LED lighting device according to the present embodiment, two kinds of white light emitting diodes from which the color temperature differs mutually, for example are used as the LED1 which composes the first light-emitting unit 9 and the LED2 which composes the second light-emitting unit 10.

The white light emitting diode having a color temperature of 5000K as the LED1, for example, and the white light emitting diode having a color temperature of 2600K as the LED2, for example are used.

However, the above-mentioned color temperatures are exemplifying, and in order to calibrate the color temperature (chromaticity) of the illumination light in a wide range, it is preferable to use two kinds of white light emitting diodes which the color temperature separated as much as possible.

In the LED lighting device according to the present embodiment, the range of the color temperature of the LED1 may be 2500K to 3000K, for example, and the range of the color temperature of the LED2 may be 3000K to 6500K, for example.

Figure 22:
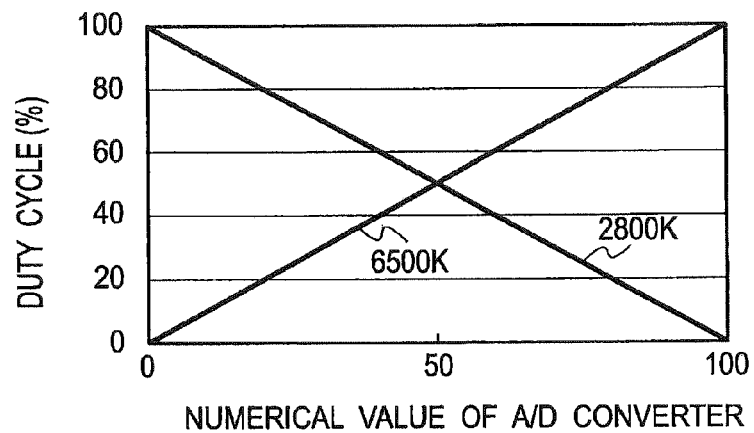
FIG. 22 It is a drawing showing the relation between a duty cycle (%) and a numerical value of an A/D converter, in the LED lighting device according to the first to third embodiment for changing the duty cycle (%) linearly for the numerical value read by the A/D converter built in a microcomputer.
Figure 23:
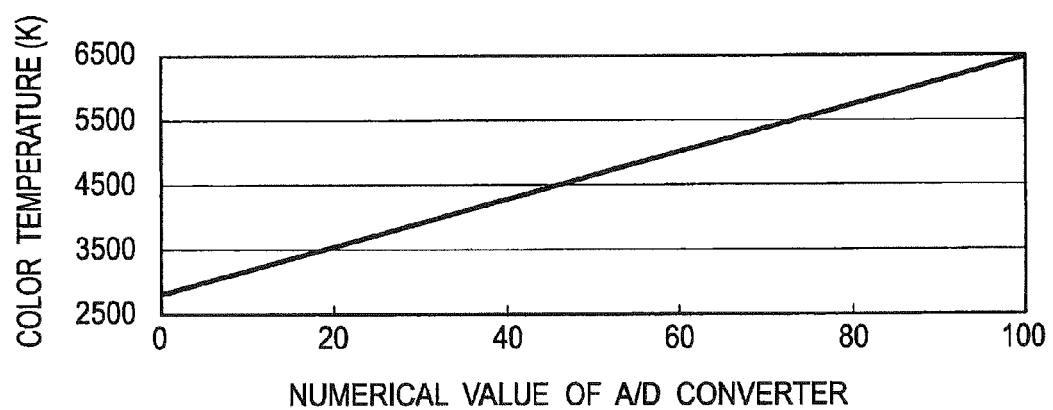
FIG. 23 It is a drawing showing the relation between a color temperature (K) and the numerical value of the A/D converter, in the LED lighting device according to the first to third embodiment.

FIG. 22 shows the relation between the duty cycle (%) and the numerical value of reading of the A/D converter in order to compare, in the LED lighting device according to the first to third embodiment which changes the duty cycle (%) linearly for the numerical value read by the A/D converter built in the microcomputer. Moreover, FIG. 23 shows the relation between the color temperature (K) and the numerical value read by the A/D converter, in the above-mentioned LED lighting device. Moreover, FIG. 24 shows the relation between the inverse correlated color temperature ($\mu K^{-1}$) and the numerical value read by the A/D converter, in the above-mentioned LED lighting device.

Figure 24:
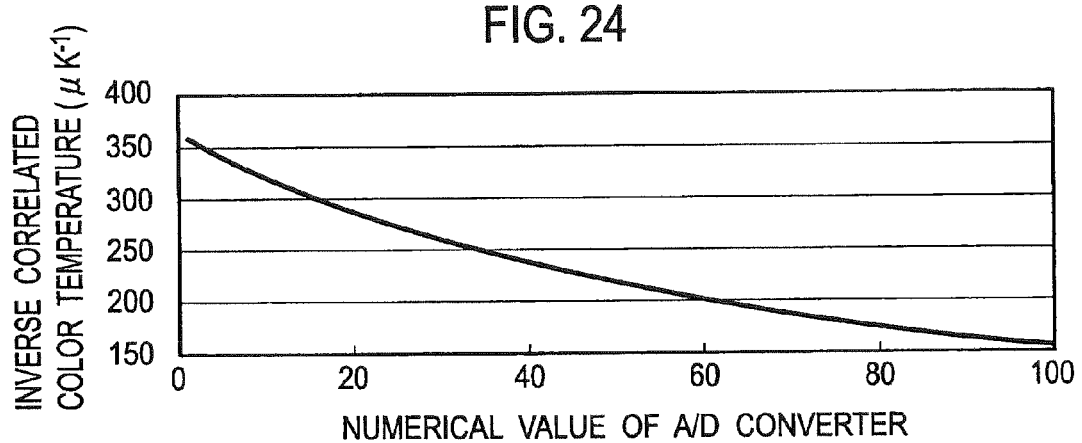
FIG. 24 It is a drawing showing the relation between inverse correlated color temperature ($\mu K^{-1}$) and the numerical value of the A/D converter, in the LED lighting device according to the first to third embodiment.

In the LED lighting device according to the first to third embodiment, as shown in FIG. 22 and FIG. 24, the color temperature is linearly made variable by changing the duty cycle ratio linearly for the numerical value read by the A/D converter built in the microcomputer.

On the other hand, as for the regular intervals nature of human being's perception, the difference of the reciprocal of the color temperature, i.e., the difference of the inverse correlated color temperature, is nearly rather than the difference of the color temperature.

For example, human beings' perception perceives large the variation to the color temperature 3500K from the color temperature 3000K also with the same difference of 500K in the variation to the color temperature 6500K from the color temperature 6000K and the variation to the color temperature 3500K from the color temperature 3000K.

As led from FIG. 23 and FIG. 24, it is because the variation to the color temperature 3500K from the color temperature 3000K becomes about 47.6 $\mu K^{-1}$, for example, in contrast with the difference of the inverse correlated color temperature for the variation to the color temperature 6500K from the color temperature 6000K being about 12.8 $\mu K^{-1}$, for example.

Figure 25:
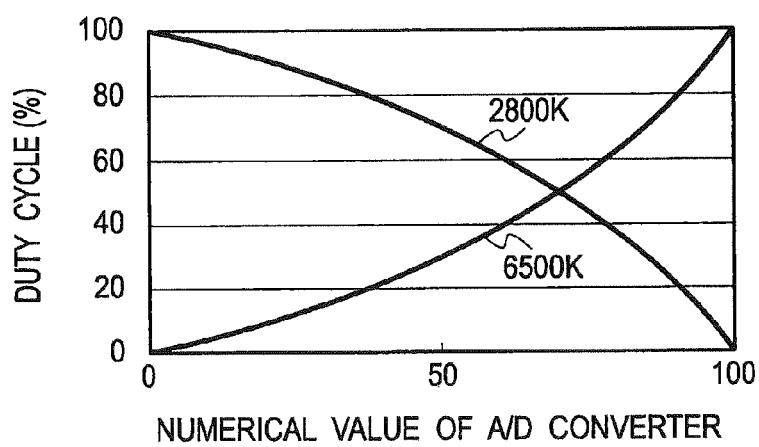
FIG. 25 It is a drawing showing the relation between the duty cycle (%) and the numerical value of the A/D converter, in an LED lighting device according to a fourth embodiment of the present invention.
Figure 26:
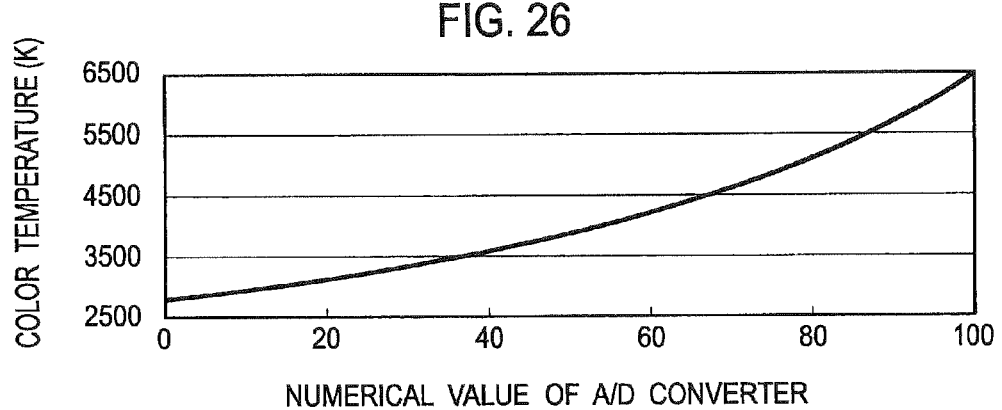
FIG. 26 It is a drawing showing the relation between the color temperature (K) and the numerical value of the A/D converter, in the LED lighting device according to the fourth embodiment of the present invention.
Figure 27:
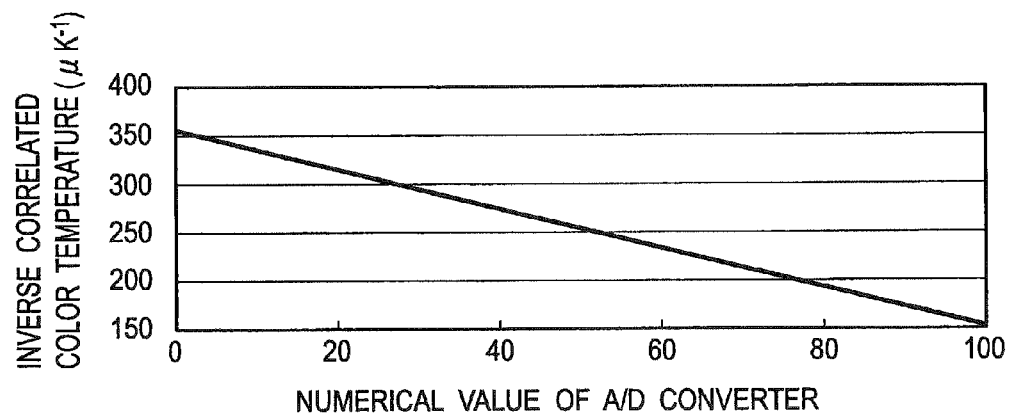
FIG. 27 It is a drawing showing the relation between the inverse correlated color temperature ($\mu K^{-1}$) and the numerical value of the A/D converter, in the LED lighting device according to the fourth embodiment of the present invention.

In the LED lighting device according to the present embodiment, the relation between the duty cycle (%) and the numerical value of the A/D converter is expressed as shown in FIG. 25. Moreover, in the LED lighting device according to the present embodiment, the relation between the color temperature (K) and the numerical value of the A/D converter is expressed as shown in FIG. 26. Moreover, in the LED lighting device according to the present embodiment, the relation between the inverse correlated color temperature ($\mu K^{-1}$) and the numerical value of the A/D converter is expressed as shown in FIG. 27.

Figure 28:
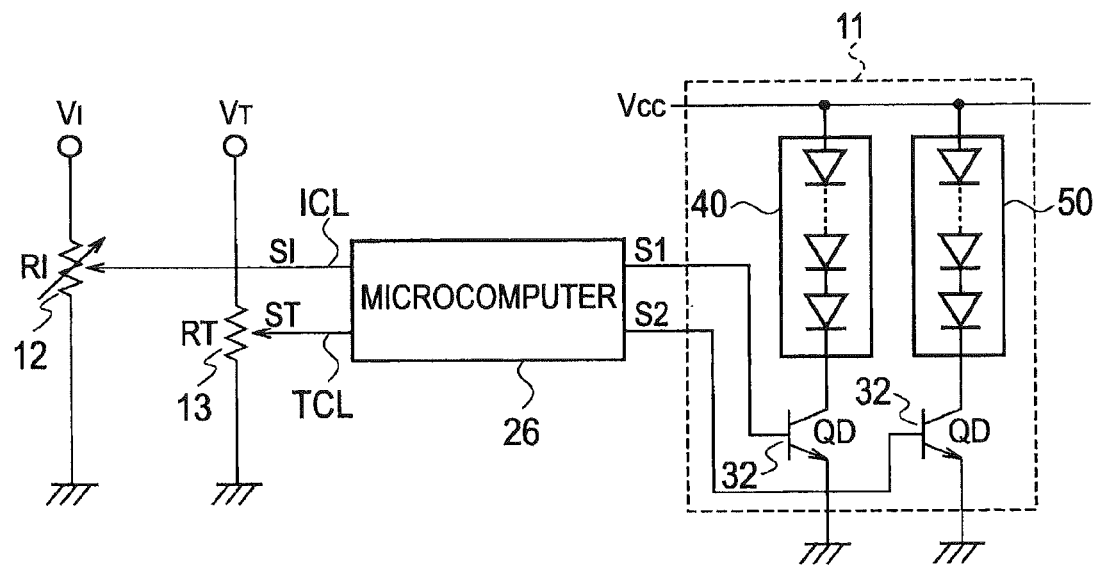
FIG. 28 It is another schematic basic circuit block configuration diagram of the LED lighting device according to the fourth embodiment of the present invention.

As shown in FIG. 28, another configuration example of the LED lighting device according to the present embodiment includes a first LED column 40 and a second LED column 50 from which the color temperature differ mutually, and a microcomputer 26 for executing the light/quench control of the first LED column 40 and the second LED column 50. Moreover, the LED lighting device according to the present embodiment shown in FIG. 28 includes an LED module 11 for mounting a transistor QD for turning ON and OFF each LED columns 40 and 50, and a control unit for mounting variable resistances RI and RT for changing the luminosity and the color tone and the microcomputer 26.

The microcomputer 26 executes the cyclic light/quench control of the first LED column 40 and the second LED column 50, and executes the light control of the first LED column 40 and the second LED column 50 by the PWM control or the PNM control in the fixed cycle TN so as to have the lighting period Ton for lighting/quenching the first LED column 40 and the second LED column 50 complementarily, and the quenching period Toff for quenching both the first LED column 40 and the second LED column 50.

Moreover, the chromaticity control signal ST and the luminance control signal SI are supplied to the microcomputer 26, and the switching control signals S1 and S2 are supplied to the base of the bipolar transistors for driving LEDs Q1 and Q2 from the microcomputer 26, respectively.

In the another configuration example of the LED lighting device according to the present embodiment shown in FIG. 28, the duty cycle ratio is not linearly changed for the numerical value read by the A/D converter built in the microcomputer 26, and the value of the duty cycle (%) is changed by giving a certain variable for the numerical value read by the A/D converter so that the difference of the inverse correlated color temperature may become linear.

Therefore, the chromaticity control signal ST and the luminance control signal SI are supplied to the microcomputer 26, and the switching control signals S1 and S2 for controlling the value of the duty cycle (%) are supplied from the microcomputer 26 to the base of each bipolar transistor for driving LEDs QD so that the difference of the inverse correlated color temperature of the first LED column 40 and the second LED column 50 may became linear.

Also in the LED lighting device according to the present embodiment shown in FIG. 28, the LED column 40 and the LED column 50 of two kinds of color temperatures of the color temperature 2800K and the color temperature 6500K may be used, for example.

As for calibration of the luminosity and the color tone, the voltage value of the variable resistance RI and RT are read by the A/D converter built in the microcomputer 26. The formula to which the duty cycle a (%) is changed so that the difference of the inverse correlated color temperature may become linear is expressed such as the following formula (5).

(Driving Method of LED Lighting Device)

The driving method of the LED lighting device according to the present embodiment, the LED lighting device including the first light emitting diode and the second light emitting diode differing in the color temperature mutually, and the microcomputer for executing the light/quench control of the first light emitting diode and the second light emitting diode, the driving method includes the step of: executing, by the microcomputer, the cyclic light/quench control of the first light emitting diode and the second light emitting diode so as to have the lighting period for lighting/quenching the first light emitting diode and the second light emitting diode complementarily, and the quenching period for quenching both the first light emitting diode and the second light emitting diode; and executing, by the microcomputer, the variable control of the ratio between the lighting period of the first light emitting diode and the lighting period of the second light emitting diode in the lighting period according to the difference of the inverse correlated color temperature of the first light emitting diode and the second light emitting diode.

Moreover, as for the driving method of the LED lighting device according to the present embodiment, the microcomputer builds a plurality of programs beforehand defined according to the combination of the color temperature of the first light emitting diode and the second light emitting diode, and is selectable any one of among a plurality of programs from the outside via the input terminal for program switching connected to the microcomputer.

—Inverse Correlated Color Temperature—

Figure 29:
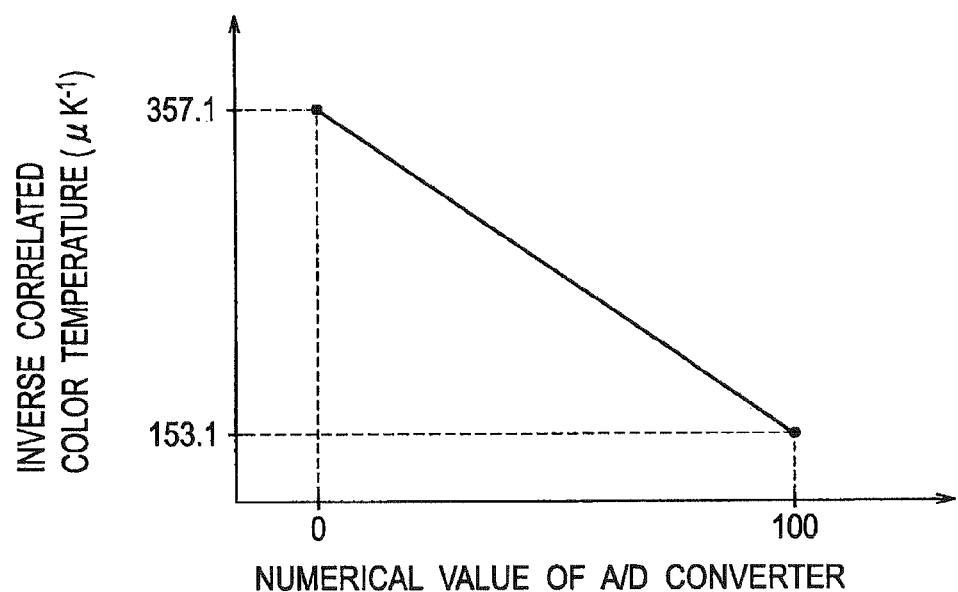
FIG. 29 It is a drawing showing an example of the relation between the inverse correlated color temperature ($\mu K^{-1}$) and the numerical value of the A/D converter, in the LED lighting device according to the fourth embodiment of the present invention.

In the LED lighting device according to the present embodiment, an example of the relation between the inverse correlated color temperature ($\mu K^{-1}$) and the numerical value of the A/D converter is expressed as shown in FIG. 29. For example, the inverse correlated color temperature of the color temperature 2800K is about 357.1 ($\mu K^{-1}$), and the inverse correlated color temperature of the color temperature 6500K is about 153.1 ($\mu K^{-1}$).

The value 357.1 ($\mu K^{-1}$) of the inverse correlated color temperature is made to correspond to the numerical value 0 of the A/D converter, the value 153.1 ($\mu K^{-1}$) of the inverse correlated color temperature is made to correspond to the numerical value 100 of the A/D converter, and the difference of the value of the inverse correlated color temperature is made to correspond linearly with the numerical value of the A/D converter.

The slope of a line showing the relation between the inverse correlated color temperature y ($\mu K^{-1}$) and the numerical value x of the A/D converter is set to $-(357.1-153.1)/100=-2.04$.

Therefore, the relation between the inverse correlated color temperature y ($\mu K^{-1}$) and the numerical value x of the A/D converter is expressed by the following formula.

$$y=-2.04x+357.1 \tag{1}$$

The color temperature b (K) in a certain location is expressed by the following formula:

$$b=2800\times(a/100)+6500(1-a/100) \tag{2}$$

where a (%) is the duty cycle of LEDs of the color temperature 2800K.

Therefore, the duty cycle a (%) is expressed by the following formula.

$$a=[(6500-b)/3700]\times100 \tag{3}$$

Since the color temperature b (K) is a reciprocal of the inverse correlated color temperature y ($\mu K^{-1}$), it is expressed by the following formula.

$$b=(1/y)\times10^6=[1/(-2.04x+357.1)]\times10^6 \tag{4}$$

Therefore, if the formula (4) is substituted for the formula (3), the duty cycle a (%) is expressed by the following formula.

$$a=-[1/3700(2.04x+357.1)]\times 10^8+[65/37]\times 10^2 \quad (5)$$

The result of having plotted the formula (5) corresponds to FIG. 25.

In FIG. 1, the color temperature of LED1 is set to A and the color temperature of LED2 is set to B (where A<B). The inverse correlated color temperature of LED1 is expressed by $1/A \times 10^6$, and the inverse correlated color temperature of LED2 is expressed by $1/B \times 10^6$.

When it is made for the inverse correlated color temperature to become linear, the inclination at that time is expressed by $$(10^6/A - 10^6/B)/100.$$

When the duty cycle of LED1 is set to a (%) for the numerical value x read by the A/D converter (where 0<=x<=100), the inverse correlated color temperature y at this time is expressed by the following formula.

$$y=[(10^6/A - 10^6/B)/100]x + 10^6/A \quad (6)$$

Since the color temperature b becomes a reciprocal of the inverse correlated color temperature y, it is expressed by the following formula.

$$b = 1/y \cdot 10^6 = 100AB/[(A-B)x+100B] \quad (7)$$

Figure 31:
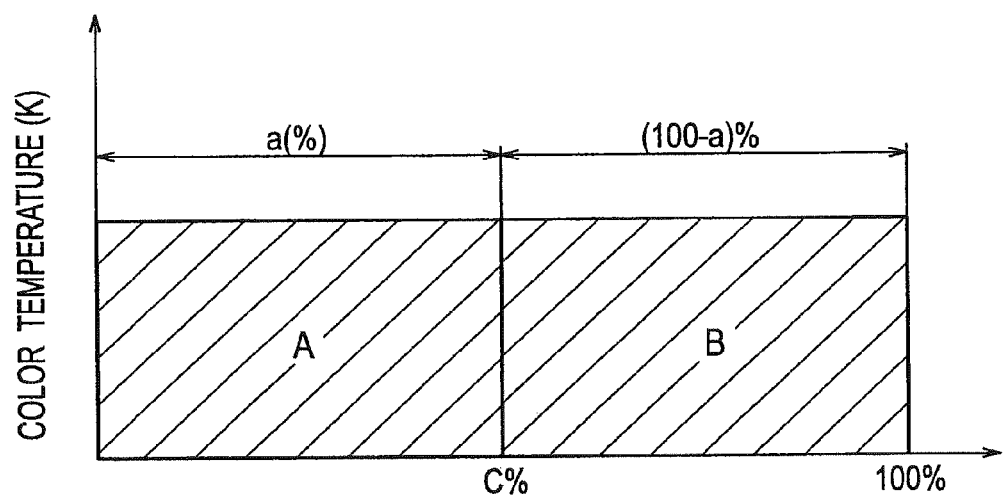
FIG. 31 It is a schematic explanatory diagram of the color temperature (K) of the duty cycle of a period a (%) which the LED1 turns ON, and the duty cycle (100-a) (%) of a period which the LED2 turns ON, in the LED lighting device according to the fourth embodiment of the present invention.

FIG. 31 is a schematic explanatory diagram of the duty cycle a (%) of a period which the LED1 turns ON, and the duty cycle (100-a) (%) of a period which the LED2 turns ON, in the LED lighting device according to the present embodiment.

As shown in FIG. 31, the color temperature b at the time of duty cycle a (%) of LED1 is expressed by the following formula.

$$b = Aa/100 + B(100-a)/100 \quad (8)$$

According to the formula (7) and the formula (8), the duty cycle a (%) of the LED1 is expressed by the following formula.

$$a = [100/(A-B)] \times [100AB/\{(A-B)x+100B\}] - 100B/(A-B) \quad (9)$$
$$= AB \cdot 10^4 / \{(A-B)^2 x + 100B(A-B)\} - 100B/(A-B)$$

The value of the duty cycle a (%) of LED1 corresponding to the numerical value x read by the A/D converter is determined by substituting A and B for the formula (9) with the combination of the color temperature A of LED1 and the color temperature B of LED2.

—Program Switching Control—

Figure 30:
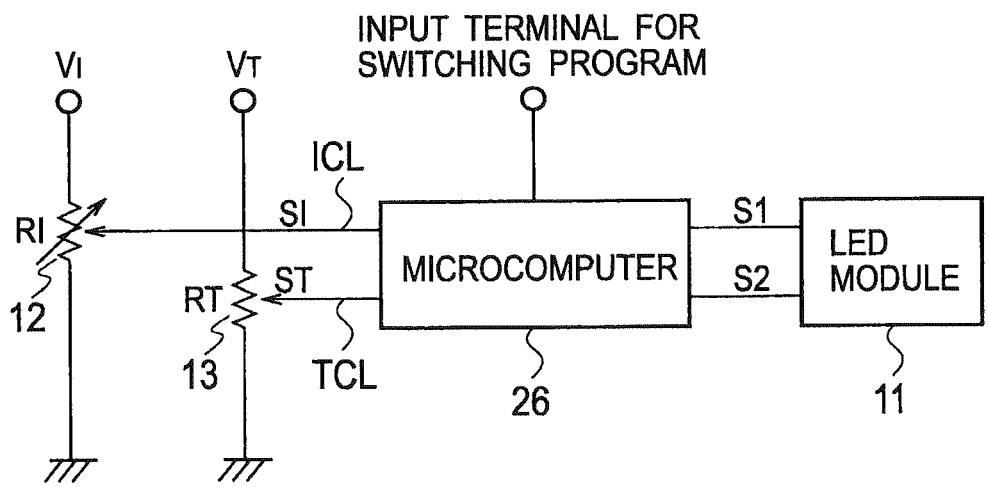
FIG. 30A It is a schematic explanatory diagram of the combination of the color temperature of LED1 and LED2 which are applied, and corresponding programs 1-3, in the LED lighting device according to the fourth embodiment of the present invention.
FIG. 30B It is another schematic basic circuit block configuration diagram for providing a microcomputer with an input terminal for program switching, in the LED lighting device according to the fourth embodiment of the present invention.

In the LED lighting device according to the present embodiment, the relation between the combination of the color temperature of LED1 and LED2 which are applied, and the corresponding programs 1 to 3 is expressed as shown in FIG. 30A.

Moreover, another schematic basic circuit block configuration of the LED lighting device according to the present embodiment for providing the microcomputer 26 with an input terminal for program switching is expressed as shown in FIG. 30B. Since it is the same as that of FIG. 28 except providing the microcomputer 26 with the input terminal for program switching, other explanation is omitted.

The color change of lighting suitable for human beings' perception becomes possible by dividing the numerical value read by the A/D converter into 100 steps, and making variable the duty cycle of LEDs of the color temperature 6500K and the duty cycle of LEDs of the color temperature 2800K according to its value, as shown in FIG. 25.

In the LED lighting device and the driving method for the same according to the present embodiment, although the example using the white LEDs of 2800K and 6500K is shown, even when using LEDs of 3500K and 5000K as an white LEDs, the color change of lighting suitable for human beings' perception becomes possible by similarly dividing the numerical value read by the A/D converter into 100 steps, and changing the duty cycle of each LEDs as well as FIG. 25 according to its value. It is the same even when using the combination of LEDs of 3500K and 6500K as the white LEDs.

For example, as shown in FIG. 30A, when the combination of two white LEDs is decided, it can correspond to in one control circuit, and time and effort, such as program change, can be saved for the combination of a plurality of LEDs, by installing a plurality of programs 1 to 3 into the microcomputer 26 beforehand, attaching the input terminal for program switching to the microcomputer 26, and changing the programs 1 to 3 according to the combination of two white LEDs.

According to the LED lighting device and the driving method for the same according to the present embodiment, the variation of the inverse correlated color temperature having linearity for the amount of variations of the reading value of the A/D converter can be reproduced, and the LED lighting device according to the regular intervals nature of human being's perception can be provided, by changing the duty cycle by giving the variable for the reading value of the A/D converter.

According to the LED lighting device and the driving method for the same according to the present embodiment, by changing the programs with the input terminal for program switching, it is possible of correspondence of various combination in one control circuit, and the time and effort into which the programs are changed for every combination can be reduced.

—Inverse Correlated Color Temperature Control Operation—

Next, in the LED lighting device according to the present embodiment, the inverse correlated chromaticity control operation (inverse correlated color temperature control operation) of the illumination light by the control circuit 6 will be explained in detail, referring to FIG. 32A to FIG. 32C. In addition, the reference numerals S1 to S2 of FIG. 32A to FIG. 32C show respectively the logical state of the switching control signals S1 to S2 (the light/quench state of LED1 to LED2).

Figure 32A:
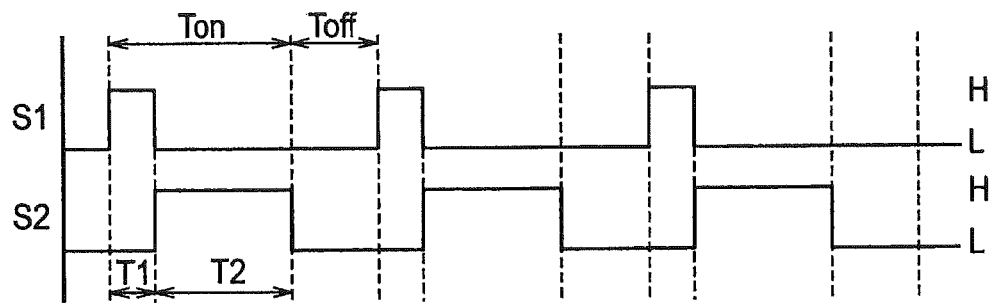
FIG. 32A It is a drawing for explaining the chromaticity control operation of the illumination light, and is an example of T1<T2 in contrast to the lighting period Ton (=T1+T2), in the LED lighting device according to the fourth embodiment of the present invention.
Figure 32B:
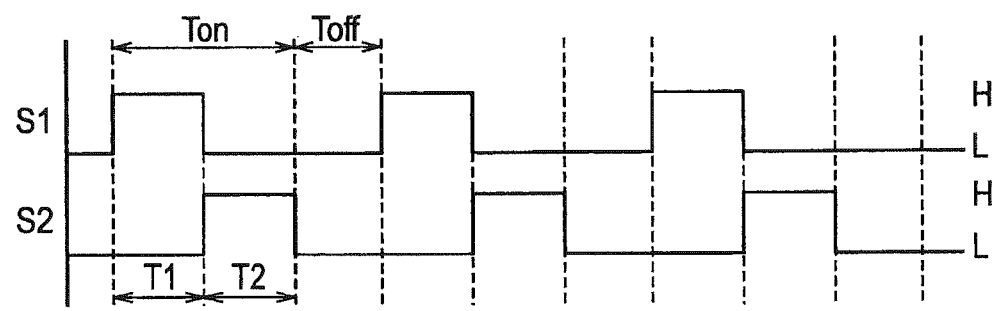
FIG. 32B It is a drawing for explaining the chromaticity control operation of the illumination light, and is an example of T1=T2, in the LED lighting device according to the fourth embodiment of the present invention.
Figure 32C:
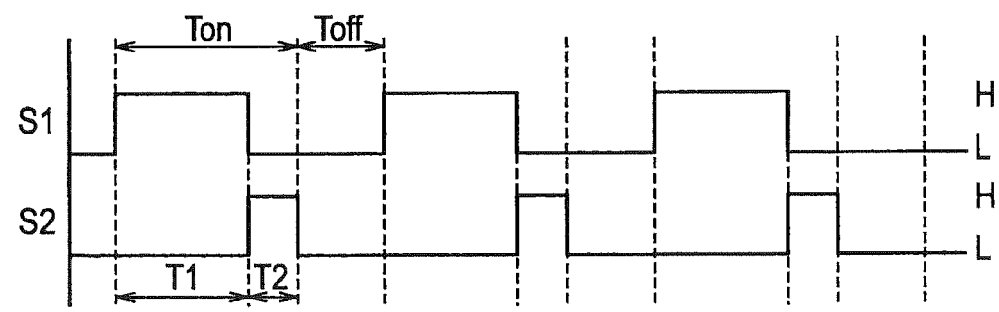
FIG. 32C It is a drawing for explaining the chromaticity control operation of the illumination light, and is an example of T1>T2, in the LED lighting device according to the fourth embodiment of the present invention.

As shown in FIG. 32A to FIG. 32C, the control circuit 6 executes the cyclic light/quench control of the LED1 and the LED2, so as to have the lighting period Ton for lighting/quenching the LED1 and the LED2 complementarily (in other words, so that both the on duty cycle becomes 100% in total), and the quenching period Toff for quenching both the LED1 and the LED2.

Moreover, the control circuit 6 executes the variable control of the ratio between the lighting periods T1 of LED1 and the lighting period T2 of LED2 in the lighting period Ton according to the difference of the inverse correlated color temperature of the LED1 and the LED2.

More specifically, what is necessary is just to raise, by controlling, the ratio which the lighting period T2 of LED2 occupies for the lighting period Ton (the on duty cycle of LED2) one after another when reducing the color temperature of the illumination light (when raising the inverse correlated color temperature) (FIG. 32C→FIG. 32B→FIG. 32A). On the other hand, what is necessary is just to reduce, by controlling, the on duty cycle of LED2 one after another when raising the color temperature of the illumination light (when reducing the inverse correlated color temperature) (FIG. 32A→FIG. 32B→FIG. 32C).

—Luminance Control Operation—

Next, the luminance control operation of the illumination light by the control circuit 6 will be explained in detail, referring to FIG. 33A to FIG. 33C. In addition, the reference numerals S1 to S2 of FIG. 33A to FIG. 33C show respectively the logical state of the switching control signals S1 to S2 (the light/quench state of LED1 to LED2).

Figure 33A:
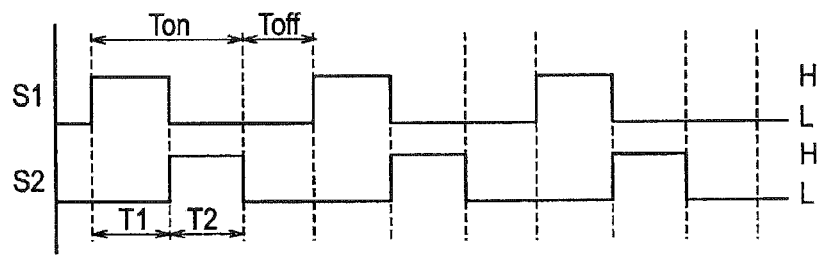
FIG. 33A It is a drawing for explaining an example of luminance control operation of the illumination light in an LED lighting device according to the fourth embodiment of the present invention, and is a drawing for explaining an aspect that it keeps up the length of the lighting period Ton uniformly, performs variable control of the length of the quenching period Toff according to a luminance control signal, sets up the quenching period Toff long one after another when reducing the luminance of the illumination light, and sets up the quenching period Toff short one after another when raising the luminance of the illumination light.
Figure 33B:
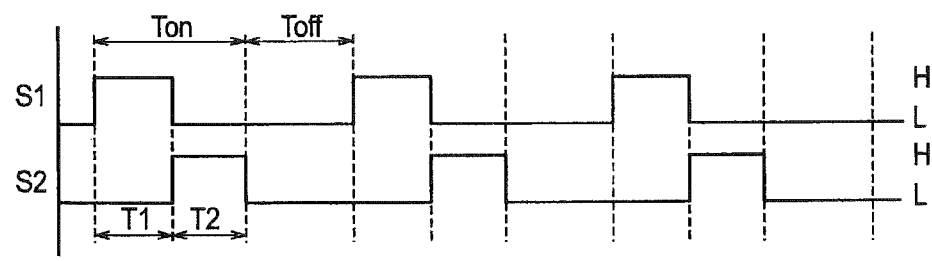
FIG. 33B It is an operation explanatory diagram in the case of setting up the quenching period Toff longer than FIG. 33A.
Figure 33C:
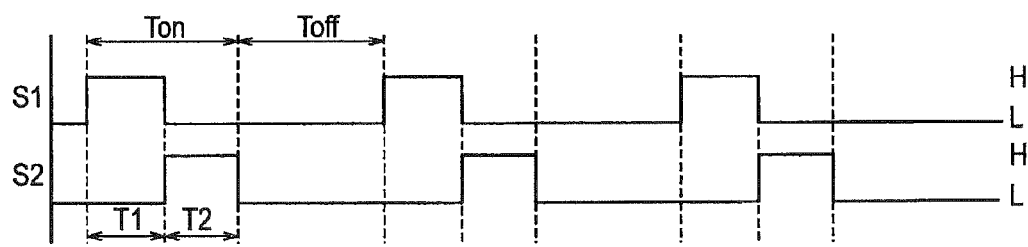
FIG. 33C It is an operation explanatory diagram in the case of setting up the quenching period Toff longer than FIG. 33B.

As shown in FIG. 33A to FIG. 33C, the control circuit 6 executes the variable control of the length of the quenching period Toff according to the luminance control signal, whereas the control circuit 6 keeps up the length of the lighting period Ton uniformly.

More specifically, what is necessary is just to lengthen the quenching period Toff one after another when reducing the luminance of the illumination light (FIG. 33A→FIG. 33B→FIG. 33C). On the other hand, what is necessary is just to shorten the quenching period Toff one after another when raising the luminance of the illumination light (FIG. 33C→FIG. 33B→FIG. 33A).

Figure 34:
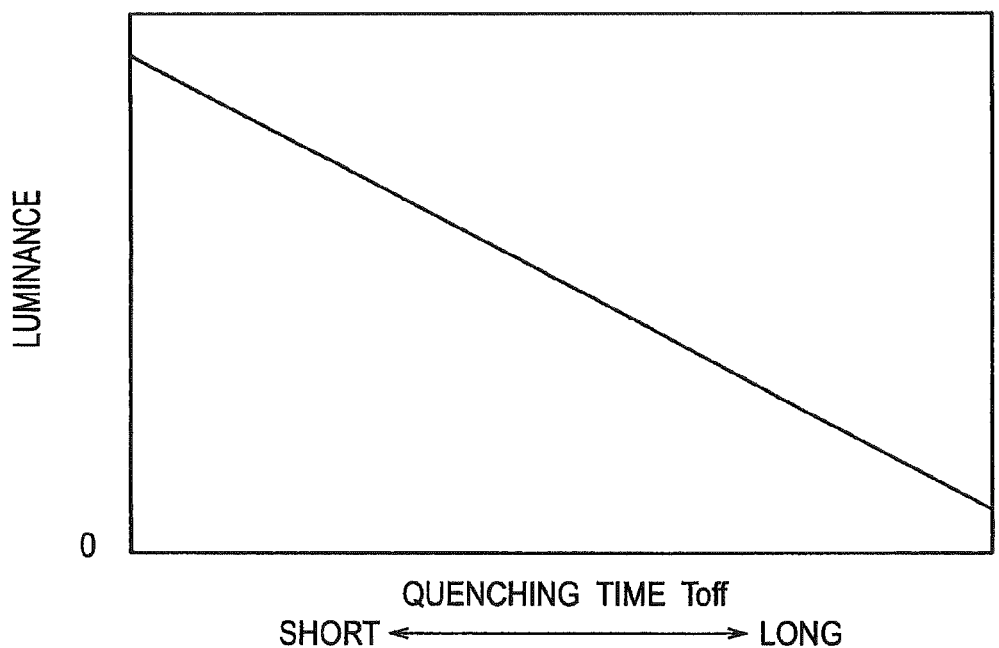
FIG. 34 It is a drawing for explaining the luminance variation according to the length of the quenching period Toff, in the LED lighting device according to the fourth embodiment of the present invention.

In the LED lighting device according to the present embodiment, as shown in FIG. 34, as for the luminance variation according to the length of the quenching period Toff, the luminance of the illumination light becomes lower as the quenching period Toff is long. On the other hand, the luminance of the illumination light becomes higher as the quenching period Toff is short.

Moreover, in the LED lighting device according to the present embodiment, another example of the luminance control operation of the illumination light will be explained using FIG. 35A to FIG. 35C. In addition, the reference numerals S1 to S2 of FIG. 35A to FIG. 35C show respectively the logical state of the switching control signals S1 to S2 (the light/quench state of LED1 to LED2).

Figure 35A:
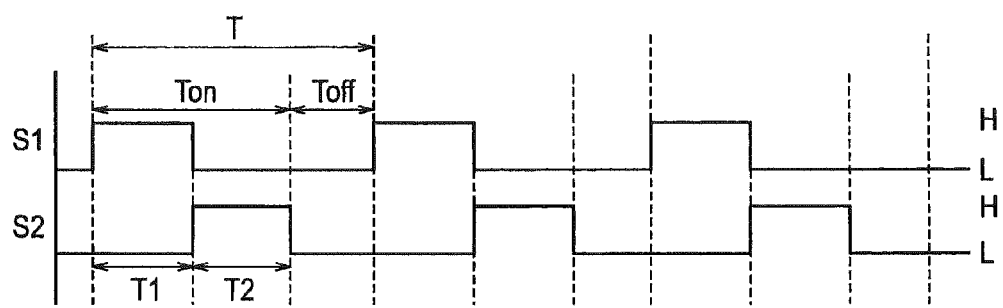
FIG. 35A It is a drawing for explaining another example of luminance control operation of the illumination light in the LED lighting device according to the fourth embodiment of the present invention, and is a drawing for explaining an aspect that it performs variable control of the ratio between the lighting period Ton and the quenching period Toff in the predetermined lighting/quenching cycle T according to a luminance control signal, sets up to reduces the ratio (total of on duty cycle which combines a first light-emitting unit LED1 and a second light-emitting unit LED2) which the lighting period Ton occupies for the lighting/quenching cycle T one after another when reducing the luminance of the illumination light, and sets up to raise a total of on duty cycle when raising the luminance of the illumination light conversely one after another.
Figure 35B:
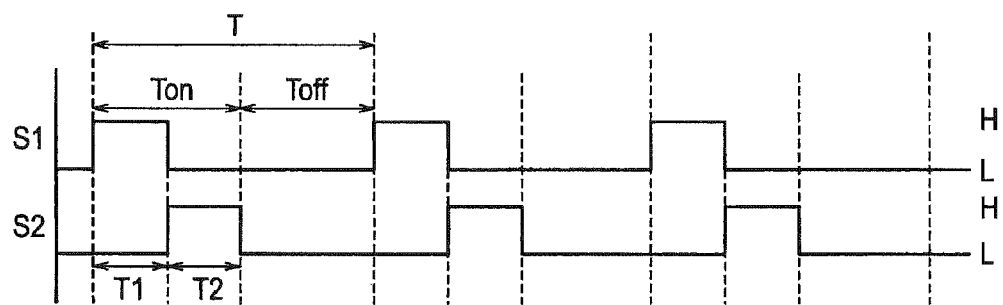
FIG. 35B It is an operation explanatory diagram in the case of setting up to reduce the total of on duty cycle rather than FIG. 35A.
Figure 35C:
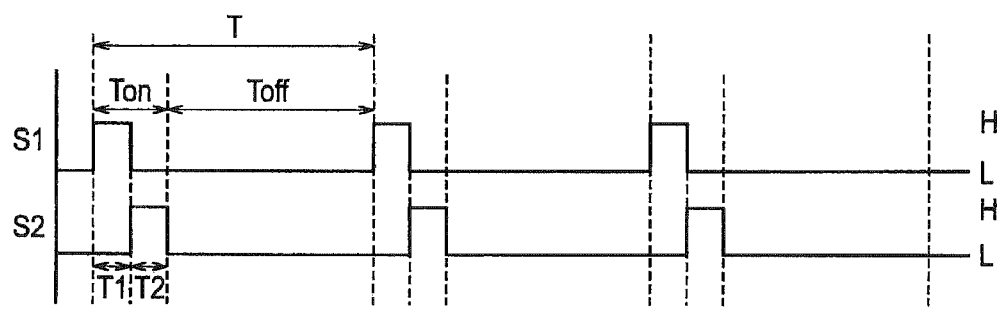
FIG. 35C It is an operation explanatory diagram in the case of setting up to reduce the total of on duty cycle rather than FIG. 35B.

As shown in FIG. 35A to FIG. 35C, the control circuit 6 executes the variable control of the ratio between the lighting period Ton and the quenching period Toff in the predetermined lighting/quenching cycle T according to the luminance control signal.

More specifically, what is necessary is just to reduce the ratio which the lighting period Ton occupies for the lighting/quenching cycle T (total of the on duty cycle combining the LED1 and the LED2) one after another when reducing the luminance of the illumination light (FIG. 35A→FIG. 35B→FIG. 35C). On the other hand, what is necessary is just to raise the total of the on duty cycle one after another when raising the luminance of the illumination light (FIG. 35C→FIG. 35B→FIG. 35A).

In the LED lighting device according to the present embodiment, the chromaticity control operation (color temperature control operation) of the illumination light by the control circuit 6 is similarly expressed as the first embodiment shown in FIG. 15A to FIG. 15C.

In the LED lighting device according to the present embodiment, as shown in FIG. 15A to FIG. 15C, the control circuit 6 executes the variable control of the ratio between the lighting period T1 of the first light-emitting unit 9 and the lighting period T2 of the second light-emitting unit 10 in the lighting period Ton so that the difference of the inverse correlated color temperature of the first LED column 40 and the second LED column 50 may become linear according to the chromaticity control signal ST, and executes the light control of the first light-emitting unit 9 and the second light-emitting unit 10 by the PNM control in the fixed cycle TN.

What is necessary is just to raise the ratio which the lighting period T2 of the second light-emitting unit LED2 occupies for the lighting period Ton (the on duty cycle of the second light-emitting unit LED2) one after another When reducing the color temperature of the illumination light (when raising the inverse correlated color temperature) (FIG. 15C→FIG. 15B→FIG. 15A). On the other hand, what is necessary is just to reduce the on duty cycle of the second light-emitting unit LED2 one after another when raising the color temperature of the illumination light (when decreasing the inverse correlated color temperature) (FIG. 15A→FIG. 15B→FIG. 15C).

As shown in FIG. 15A to FIG. 15C, the control circuit 6 executes the cyclic light/quench control of the LED1 and LED2 so as to have the lighting period Ton for lighting/quenching the LED1 and the LED2 complementarily (that is, so that both of the on duty cycles may be 100% in total) and the quenching period Toff for quenching both the LED1 and LED2.

Moreover, as for the ON waveform of the lighting periods T1 of LED1 and the lighting period T2 of LED2 in the lighting period Ton, the pulse number in the fixed cycle is further reduced by the PNM control, it can set the OFF period to 0 completely, and it is calibratable to 0 in the luminance.

Moreover, also in the LED lighting device the driving method for the same according to the present embodiment, it makes possible 0 to 100% of brightness variable by removing the ON waveform of the lighting periods T1 and T2 by the PNM control.

Moreover, also in the LED lighting device and driving method according to the present embodiment, since it becomes possible to make the luminosity into 0 to 100%, the application range of a lighting apparatus becomes wide.

According to the present embodiment, the LED lighting device and the driving method for the same according to the regular intervals nature of human being's perception can be provided by calibrating so that the difference of the inverse correlated color temperature of the LED illumination light may become linearity, and calibrating the luminance.

Fifth Embodiment

LED Lighting Device

It is only that an LED lighting device according to a fifth embodiment of the present invention differs from the LED lighting device according to the first to third embodiment at the point of not changing the duty cycle ratio linearly for the numerical value of reading of the A/D converter built in the microcomputer, but changing the value of the duty cycle by giving a certain variable for the reading value of the A/D converter so that the difference of the inverse correlated color temperature may become linear. The fundamental circuit configuration is the same as that of FIG. 1, and the detailed circuit configuration is the same as that of FIG. 7A to FIG. 10C. Furthermore, the PNM control is applied as well as the LED lighting device according to the first to third embodiment.

Moreover, as shown in FIG. 12 to FIG. 14B, it is the same as that of the LED lighting device according to the first embodiment about a circuit block configuration of the LED drive circuit system in the case of mounting by adjoining two LED columns from which the color temperature differs, a circuit block configuration in the case of mounting by adjoining two LED columns from which the color temperature differs, and arraying the n-pairs, etc. Accordingly, the explanation which duplicates with the LED lighting device according to the first to third embodiment is omitted.

The LED lighting device according to the present embodiment includes a first light-emitting unit 9 and a second light-emitting unit 10 from which a color temperature differs mutually, and a control circuit 6 for executing light/quench control of the first light-emitting unit 9 and the second light-emitting unit 10, as well as the first embodiment shown in FIG. 1.

The control circuit 6 executes a cyclic light/quench control of the first light-emitting unit 9 and the second light-emitting unit 10 so as to have the lighting period Ton for lighting/quenching the first light-emitting unit 9 and the second light-emitting unit 10 complementarily and the quenching period Toff for quenching both the first light-emitting unit 9 and the second light-emitting unit 10, and executes a light control of the first light-emitting unit 9 and the second light-emitting unit 10 by the PWM control or the PNM control in the fixed cycle TN.

The chromaticity control signal ST and the luminance control signal SI are supplied to the control circuit 6, and the control circuit 6 supplies the switching control signals S1 and S2 to the base of bipolar transistors for driving LEDs Q1 and Q2, respectively. Moreover, the resistances R1 and R2 are connected to the LED1 and the LED2 in series, respectively, and are achieved so as to flow the fixed current.

In the LED lighting device according to the present embodiment, the duty cycle ratio is not linearly changed for the numerical value of reading of the A/D converter built in the microcomputer composing the control circuit 6, and the value of the duty cycle (%) is changed by giving a certain variable for the numerical value read by the A/D converter so that the difference of the inverse correlated color temperature of the first light-emitting unit 9 and the second light-emitting unit 10 may become linear.

Therefore, in the LED lighting device according to the present embodiment, the chromaticity control signal ST and the luminance control signal SI are supplied to the control circuit 6, and the switching control signals S1 and S2 for controlling the value of the duty cycle (%) are supplied to the base of the bipolar transistors for driving LEDs Q1 and Q2, respectively, from the control circuit 6 so that the difference of the inverse correlated color temperature of the first light-emitting unit 9 and the second light-emitting unit 10 may become linear.

The LED lighting device according to the present embodiment includes a first light emitting diode LED1 and a second light emitting diode LED2 from which a color temperature differs mutually, and a control circuit 6 for executing the light/quench control of the first light emitting diode LED1 and the second light emitting diode LED2, as well as the first embodiment shown in FIG. 7A.

The control circuit 6 includes a light/quench control unit 3 for executing the cyclic light/quench control of the first light emitting diode LED1 and the second light emitting diode LED2 so as to have the lighting period Ton for lighting/quenching the first light emitting diode LED1 and the second light emitting diode LED2 complementarily and the quenching period Toff for quenching both first light emitting diode LED1 and the second light emitting diode LED2, and a PNM control unit 7 for executing the light control of the first light emitting diode LED1 and the second light emitting diode LED2 by the PNM control in the fixed cycle TN, as well as the first embodiment shown in FIG. 7B.

Also in the LED lighting device according to the present embodiment, the luminance control operation of the illumination light by the control circuit 6 is similarly expressed as the second embodiment shown in FIG. 18A to FIG. 18C. The reference numerals S1 and S2 of FIG. 18A to FIG. 18C show the logical state of the switching control signals S1 and S2, i.e., the light/quench state of LED1 and LED2, respectively.

In the LED lighting device according to the present embodiment, as shown in FIG. 18A to FIG. 18C, the light/quench control unit 3 further executes the variable control of the length of the quenching period Toff according to the luminance control signal SI whereas the length of the lighting period Ton is kept up uniformly, and the PNM control unit 7 also executes the light control of the first light emitting diode LED1 and the second light emitting diode LED2 by the PNM control in the fixed cycle TN according to the luminance control signal SI.

Also in the LED lighting device according to the present embodiment, the luminance variation according to the length of the quenching period Toff is expressed as shown in FIG. 19.

As shown in FIG. 19, the luminance of the illumination light becomes low as the quenching period Toff long, and the luminance of the illumination light becomes high conversely as the quenching period Toff is short. When performing the variable control of the length of the quenching period Toff according to the luminance control signal SI whereas the length of the lighting period Ton is kept up uniformly, and reducing the luminance of the illumination light, the quenching period Toff is set up long one after another (FIG. 18A→FIG. 18B→FIG. 18C).

When raising the luminance of the illumination light, the quenching period Toff is set up short one after another (FIG. 18C→FIG. 18B→FIG. 18A).

In the LED lighting device and the driving method for the same according to the present embodiment, as for the ON waveform of the lighting periods T1 of LED1 and the lighting period T2 of LED2 in the lighting period Ton, the pulse number in the fixed cycle TN is reduced by the PNM control, it can set the OFF period to 0 completely, and it is calibratable to 0 in the luminance, as well as the first embodiment.

According to the present embodiment, the LED lighting device and a driving method for the same according to the regular intervals nature of human being's perception can be provided by calibrating so that the difference of the inverse correlated color temperature of the LED illumination light may become linearity, and calibrating the luminance.

Sixth Embodiment

LED Lighting Device

It is only that an LED lighting device according to a fourth embodiment of the present invention differs from the LED lighting device according to the first to third embodiment at the point of not changing the duty cycle ratio linearly for the numerical value of reading of the A/D converter built in the microcomputer, but changing the value of the duty cycle by giving a certain variable for the reading value of the A/D converter so that the difference of the inverse correlated color temperature may become linear. The fundamental circuit configuration is the same as that of FIG. 1, and the detailed circuit configuration is also the same as that of FIG. 7A to FIG. 10C. Furthermore, the PNM control is applied as well as the LED lighting device according to the first to third embodiment.

Moreover, as shown in FIG. 12 to FIG. 14B, it is the same as that of the LED lighting device according to the first embodiment about a circuit block configuration of the LED drive circuit system in the case of mounting by adjoining two LED columns from which the color temperature differs, a circuit block configuration in the case of mounting by adjoining two LED columns from which the color temperature differs, and arraying the n-pairs, etc. Accordingly, the explanation which duplicates with the LED lighting device according to the first to third embodiment is omitted.

The LED lighting device according to the present embodiment includes a first light-emitting unit 9 and a second light-emitting unit 10 from which a color temperature differs mutually, and a control circuit 6 for executing light/quench control of the first light-emitting unit 9 and the second light-emitting unit 10, as well as the first embodiment shown in FIG. 1.

The control circuit 6 executes a cyclic light/quench control of the first light-emitting unit 9 and the second light-emitting unit 10 so as to have the lighting period Ton for lighting/quenching the first light-emitting unit 9 and the second light-emitting unit 10 complementarily and the quenching period Toff for quenching both the first light-emitting unit 9 and the second light-emitting unit 10, and executes a light control of the first light-emitting unit 9 and the second light-emitting unit 10 by the PWM control or the PNM control in the fixed cycle TN.

The chromaticity control signal ST and the luminance control signal SI are supplied to the control circuit 6, and the control circuit 6 supplies the switching control signals S1 and S2 to the base of bipolar transistors for driving LEDs Q1 and Q2, respectively. Moreover, the resistances R1 and R2 are connected to the LED1 and the LED2 in series, respectively, and are achieved so as to flow the fixed current.

In the LED lighting device according to the present embodiment, the duty cycle ratio is not linearly changed for the numerical value of reading of the A/D converter built in the microcomputer composing the control circuit 6, and the value of the duty cycle (%) is changed by giving a certain variable for the numerical value read by the A/D converter so that the difference of the inverse correlated color temperature of the first light-emitting unit 9 and the second light-emitting unit 10 may become linear.

Therefore, in the LED lighting device according to the present embodiment, the chromaticity control signal ST and the luminance control signal SI are supplied to the control circuit 6, and the switching control signals S1 and S2 for controlling the value of the duty cycle (%) are supplied to the base of the bipolar transistors for driving LEDs Q1 and Q2, respectively, from the control circuit 6 so that the difference of the inverse correlated color temperature of the first light-emitting unit 9 and the second light-emitting unit 10 may become linear.

The LED lighting device according to the present embodiment includes a first light emitting diode LED1 and a second light emitting diode LED2 from which a color temperature differs mutually, and a control circuit 6 for executing the light/quench control of the first light emitting diode LED1 and the second light emitting diode LED2, as well as the first embodiment shown in FIG. 7A.

The control circuit 6 includes a light/quench control unit 3 for executing the cyclic light/quench control of the first light emitting diode LED1 and the second light emitting diode LED2 so as to have the lighting period Ton for lighting/quenching the first light emitting diode LED1 and the second light emitting diode LED2 complementarily and the quenching period Toff for quenching both first light emitting diode LED1 and the second light emitting diode LED2, and a PNM control unit 7 for executing the light control of the first light emitting diode LED1 and the second light emitting diode LED2 by the PNM control in the fixed cycle TN, as well as the first embodiment shown in FIG. 7B.

Also in the LED lighting device according to the present embodiment, the luminance control operation of the illumination light by the control circuit 6 is similarly expressed as the third embodiment shown in FIG. 20A to FIG. 20C. The reference numerals S1 and S2 of FIG. 20A to FIG. 20C show the logical state of the switching control signals S1 and S2, i.e., the light/quench state of LED1 and LED2, respectively.

Moreover, also in the LED lighting device according to the present embodiment, as shown in FIG. 18A to FIG. 18C, the light/quench control unit 3 executes the variable control of the ratio between the lighting period Ton and the quenching period Toff in the predetermined lighting/quenching cycle T according to the luminance control signal SI, and the PNM control unit 7 executes the light control of the first light emitting diode LED1 and the second light emitting diode LED2 by the PNM control in the fixed cycle TN according to the luminance control signal SI.

FIG. 20 is a drawing for explaining an example of the luminance control operation of the illumination light in the LED lighting device according to the present embodiment. When performing the variable control of the ratio between the lighting period Ton and the quenching period Toff in the predetermined lighting/quenching cycle T according to the luminance control signal SI, and reducing the luminance of the illumination light, the ratio (total of the on duty cycle combining the first light-emitting unit LED1 and the second light-emitting unit LED2) which the lighting period Ton occupies for the lighting/quenching cycle T is set up to reduce one after another (FIG. 20A→FIG. 20B→FIG. 20C). On the other hand, when raising the luminance of the illumination light, the total of the on duty cycle is set up to raise one after another (FIG. 20C→FIG. 20B→FIG. 20A).

Also in the LED lighting device according to the present embodiment, the luminance variation according to the ratio which the lighting period Ton occupies for the lighting/quenching cycle T is expressed as shown in FIG. 21.

As shown in FIG. 21, the luminance of the illumination light becomes low as the total of the on duty cycle is low, and the luminance of the illumination light becomes higher as the total of the on duty cycle is high conversely.

In addition, what is necessary is just to set to the length which does not perceive a blinking with the naked eye about the above-mentioned lighting/quenching cycle T (for example, about several 100 ms).

In the LED lighting device and the driving method for the same according to the present embodiment, as for the ON waveform of the lighting periods T1 of LED1 and the lighting period T2 of LED2 in the lighting period Ton, the pulse number in the fixed cycle TN is reduced by the PNM control, it can set the OFF period to 0 completely, and it is calibratable to 0 in the luminance, as well as the fourth embodiment.

In the LED lighting device and the driving method for the same according to the present embodiment, it becomes possible to calibrate the chromaticity of the illumination light arbitrarily, without affecting the luminance of the illumination light at all, by selecting suitably the ratio between the lighting periods T1 of LED1 and the lighting period T2 of LED2 in the lighting period Ton. Furthermore, it becomes possible to calibrate the luminance of the illumination light arbitrarily, without affecting the chromaticity of the illumination light at all, by selecting suitably the length of the quenching period Toff, or the ratio between the lighting period Ton and the quenching period Toff in the lighting/quenching cycle T.

Moreover, in the LED lighting device and the driving method for the same according to the present embodiment, since the chromaticity control and the luminance control of the illumination light are not accompanied by the driving current control of LED1 and LED2, it becomes possible to achieve control in the control circuit 6 easily.

According to the present embodiment, the LED lighting device and the driving method for the same according to the regular intervals nature of human being's perception can be provided by calibrating so that the difference of the inverse correlated color temperature of the LED illumination light may become linearity, and calibrating the luminance.

Other Embodiments

The present invention has been described by the first to sixth embodiments, as a disclosure including associated description and drawings to be construed as illustrative, not restrictive. With the disclosure, artisan might easily think up alternative embodiments, embodiment examples, or application techniques.

For example, the FET (Field Effect Transistor), such as an MOS (Metal Oxide Semiconductor) type and an MIS (Metal Insulator Semiconductor) type, may be used instead of the bipolar transistors Q1 and Q2 of FIG. 1. Moreover, a constant current source may be used instead of the resistances R1 and R2 of FIG. 1.

Such being the case, the present invention covers a variety of embodiments, whether described or not. Therefore, the technical scope of the present invention is appointed only by the invention specific matter related appropriate scope of claims from the above-mentioned explanation.

According to the present invention, it can provide the LED lighting device calibratable to 0 to 100% of wide range about the chromaticity and the luminance of the illumination light by the simple configuration.

Moreover, according to the present invention, the LED lighting device and a driving method for the same according to the regular intervals nature of human being's perception can be provided by calibrating so that the difference of the inverse correlated color temperature of the LED illumination light may become linearity, and calibrating the luminance.

INDUSTRIAL APPLICABILITY

The LED lighting device according to the embodiments of the present invention is the preferred technology for the whole LED lighting device used for various uses, such as LED astral lamp, a living interior light, a dressing light, a panel light of a show window, an advertising panel light, a panel light in an art museum, a panel light at the time of a surgical operation as medical application, mostly for the back light of a liquid crystal display.

The invention claimed is:

1. An LED lighting device comprising:
a first light-emitting unit and a second light-emitting unit differing in a color temperature mutually; and
a control circuit for generating first and second switching control signals based on a chromaticity control signal and a luminance control signal, and executing a cyclic light/quench control of the first light-emitting unit and the second light-emitting unit so as to have a lighting period and a quenching period for lighting/quenching the first light-emitting unit and the second light-emitting unit, according to the generated first and second switching control signals, and for generating a pulse number modulation output signal based on the chromaticity control signal and the luminance control signal, and executing a light control of the first light-emitting unit and the second light-emitting unit by a pulse number modulation control according to the first and second switching control signals on which the generated pulse number modulation output signal is superimposed, wherein
the control circuit comprises a first driving circuit for output the first switching control signal, and a second driving circuit for output the second switching control signal.

2. The LED lighting device according to claim 1, wherein the control circuit executes a variable control of a ratio between the lighting period of the first light-emitting unit and the lighting period of the second light-emitting unit in the lighting period, according to the chromaticity control signal, and executes a light control of the first light-emitting unit and the second light-emitting unit by the pulse number modulation control.

3. The LED lighting device according to claim 1, wherein the control circuit executes a variable control of the length of the quenching period according to the luminance control signal, whereas the length of the lighting period is kept up uniformly, and executes a light control of the first light-emitting unit and the second light-emitting unit by the pulse number modulation control.

4. The LED lighting device according to claim 1, wherein the control circuit executes a variable control of the ratio between the lighting period and the quenching period in a predetermined lighting/quenching cycle according to the luminance control signal, and executes a light control of the first light-emitting unit and the second light-emitting unit by the pulse number modulation control.

5. The LED lighting device according to claim 1, wherein the first light-emitting unit and the second light-emitting unit includes a blue light-emitting diode for emitting a blue light, and a fluorescence layer having a transparent resin which mixes uniformly a red phosphor and a green phosphor for emitting a red light and a green light respectively by exciting by the blue light, or a yellow phosphor for emitting the yellow light by exciting by the blue light.

6. The LED lighting device according to claim 1, wherein the color temperature of the first light-emitting unit is included in the range of 2500K to 3000K, and the color temperature of the second light-emitting unit is included in the range of 3000K to 6500K.

7. An LED lighting device comprising:
a first light-emitting unit and a second light-emitting unit differing in a color temperature mutually; and
a control circuit for executing a light/quench control of the first light-emitting unit and the second light-emitting unit, the control circuit including a light/quench control unit for generating first and second switching controls signal based on a chromaticity control signal and a luminance control signal, and executing a cyclic light/quench control of the first light-emitting unit and the second light-emitting unit so as to have a lighting period and a quenching period for lighting/quenching the first light-emitting unit and the second light-emitting unit, according to the generated first and second switching control signals, and a pulse number modulation control unit for generating a pulse number modulation output signal based on the chromaticity control signal and the luminance control signal, and executing a light control of the first light-emitting unit and the second light-emitting unit by a pulse number modulation control according to the first and second switching control signals on which the generated pulse number modulation output signal is superimposed, wherein
the control circuit comprises a first driving circuit for output the first switching control signal, and a second driving circuit for output the second switching control signal.

8. The LED lighting device according to claim 7, wherein the light/quench control unit further executes a variable control of the ratio between the lighting period of the first light-emitting unit and the lighting period of the second light-emitting unit in the lighting period according to the chromaticity control signal, and the pulse number modulation control unit also further executes a light control of the first light-emitting unit and the second light-emitting unit by the pulse number modulation control according to the chromaticity control signal.

9. The LED lighting device according to claim 7, wherein the light/quench control unit further executes a variable control of the length of the quenching period according to the luminance control signal whereas the length of the lighting period is kept up uniformly, and the pulse number modulation control unit also further executes a light control of the first light-emitting unit and the second light-emitting unit by the pulse number modulation control according to the luminance control signal.

10. The LED lighting device according to claim 7, wherein the light/quench control unit further executes a variable control of the ratio between the lighting period and the quenching period in a predetermined lighting/quenching cycle according to the luminance control signal, and the pulse number modulation control unit is also further executes a light control of the first light-emitting unit and the second light-emitting unit by the pulse number modulation control according to the luminance control signal.

11. An LED lighting device comprising:
a first light-emitting unit and a second light-emitting unit differing in a color temperature mutually; and
a changing operation unit for executing an operation for changing a color temperature of illumination light;
a control circuit for generating first and second switching control signals based on a chromaticity control signal and a luminance control signal, and executing a cyclic light/quench control of the first light-emitting unit and the second light-emitting unit so as to have a lighting period and a quenching period for lighting/quenching the first light-emitting unit and the second light-emitting unit, according to the generated first and second switching control signals, for generating a pulse number modulation output signal based on the chromaticity control signal and the luminance control signal, and executing a light control of the first light-emitting unit and the second light-emitting unit by a pulse number modulation control according to the first and second switching control signals on which the generated pulse number modulation output signal is superimposed, and for determining a length of the lighting period of the first light-emitting unit and a length of the lighting period of the second light-emitting unit in the lighting period in response to the operation in the changing operation unit so that an amount of variation of an inverse correlated color temperature of the illumination light with respect to an amount of the operation of the changing operation unit becomes linear, wherein
the control circuit comprises a first driving circuit for output the first switching control signal, and a second driving circuit for output the second switching control signal.

12. The LED lighting device according to claim 11, wherein
the control circuit executes a variable control of the length of the quenching period according to a luminance control signal whereas the length of the lighting period is kept up uniformly.

13. The LED lighting device according to claim 11, wherein
the control circuit determines the length of the lighting period and the length of the quenching period in a predetermined lighting/quenching cycle according to a luminance control signal.

14. An LED lighting device comprising:
a first light-emitting unit and a second light-emitting unit differing in a color temperature mutually; and
a changing operation unit for executing an operation for changing a color temperature of illumination light;
a control circuit for generating first and second switching control signals based on a chromaticity control signal and a luminance control signal, and executing a cyclic light/quench control of the first light-emitting unit and the second light-emitting unit so as to have a lighting period and a quenching period for lighting/quenching the first light-emitting unit and the second light-emitting unit, according to the generated first and second switching control signals, for generating a pulse number modulation output signal based on the chromaticity control signal and the luminance control signal, and executing a light control of the first light-emitting unit and the second light-emitting unit by a pulse number modulation control according to the first and second switching control signals on which the generated pulse number modulation output signal is superimposed, and for determining a length of the lighting period of the first light-emitting unit and a length of the lighting period of the second light-emitting unit in the lighting period, and executing a light control of the first light-emitting unit and the second light-emitting unit by a pulse number modulation control, in response to the operation in the changing operation unit so that an amount of variation of an inverse correlated color temperature of the illumination light with respect to an amount of the operation of the changing operation unit becomes linear, wherein
the control circuit comprises a first driving circuit for output the first switching control signal, and a second driving circuit for output the second switching control signal.

15. The LED lighting device according to claim 14, wherein
the control circuit executes a variable control of the length of the quenching period according to a luminance control signal whereas the length of the lighting period is kept up uniformly.

16. The LED lighting device according to claim 14, wherein
the control circuit determines the length of the lighting period and the length of the quenching period in a predetermined lighting/quenching cycle according to a luminance control signal.

17. An LED lighting device comprising:
a first light-emitting unit and a second light-emitting unit differing in a color temperature mutually; and
a changing operation unit for executing an operation for changing a color temperature of illumination light;
a control circuit for generating first and second switching control signals based on a chromaticity control signal and a luminance control signal, and executing a light/quench control of the first light-emitting unit and the second light-emitting unit, the control circuit including a light/quench control unit for executing a cyclic light/quench control of the first light-emitting unit and the second light-emitting unit, for generating a pulse number modulation output signal based on the chromaticity control signal and the luminance control signal, and executing a light control of the first light-emitting unit and the second light-emitting unit by a pulse number modulation control according to the first and second switching control signals on which the generated pulse number modulation output signal is superimposed, and further determining a length of the lighting period of the first light-emitting unit and a length of the lighting period of the second light-emitting unit in the lighting period in response to the operation in the changing operation unit so that an amount of variation of an inverse correlated color temperature of the illumination light with respect to an amount of the operation of the changing operation unit becomes linear so as to have a lighting period and a quenching period for lighting/quenching the first light-emitting unit and the second light-emitting unit, according to the generated first and second switching control signals, and a pulse number modulation control unit for executing a light control of the first light-emitting unit and the second light-emitting unit by a pulse number modulation control, and further executing a light control of the first light-emitting unit and the second light-emitting unit by the pulse number modulation control according to the amount of variation of the inverse correlated color temperature, wherein the control circuit comprises a first driving circuit for output the first switching control signal, and a second driving circuit for output the second switching control signal.

18. The LED lighting device according to claim 17, wherein the light/quench control unit further executes a variable control of the length of the quenching period according to a luminance control signal whereas the length of the lighting period is kept up uniformly, and the pulse number modulation control unit also further executes a light control of the first light-emitting unit and the second light-emitting unit by the pulse number modulation control according to the luminance control signal.

19. The LED lighting device according to claim 17, wherein the light/quench control unit further determines the length of the lighting period and the length of the quenching period in a predetermined lighting/quenching cycle according to a luminance control signal, and the pulse number modulation control unit is also further executes a light control of the first light-emitting unit and the second light-emitting unit by the pulse number modulation control according to the luminance control signal.

20. A driving method of an LED lighting device, the LED lighting device including a first light emitting diode and a second light emitting diode differing in a color temperature mutually, a microcomputer for executing a light/quench control of the first light emitting diode and the second light emitting diode, and a changing operation unit for executing an operation for changing a color temperature of illumination light, the driving method comprising:

generating, by the microcomputer, first and second switching control signals based on a chromaticity control signal and a luminance control signal, and executing, by the microcomputer, a cyclic light/quench control of the first light emitting diode and the second light emitting diode so as to have a lighting period and a quenching period for lighting/quenching the first light emitting diode and the second light emitting diode, according to the generated first and second switching control signals;

generating, by the microcomputer, a pulse number modulation output signal based on the chromaticity control signal and the luminance control signal, and executing a light control of the first light-emitting unit and the second light-emitting unit by a pulse number modulation control according to the first and second switching control signals on which the generated pulse number modulation output signal is superimposed; and determining, by the microcomputer, a length of the lighting period of the first light emitting diode and a length of the lighting period of the second light emitting diode in the lighting period in response to the operation in the changing operation unit so that an amount of variation of an inverse correlated color temperature of the illumination light with respect to an amount of the operation of the changing operation unit becomes linear, wherein the control circuit comprises a first driving circuit for output the first switching control signal, and a second driving circuit for output the second switching control signal.

* * * * *